United States Patent Office 3,281,415
Patented Oct. 25, 1966

3,281,415
STEROIDAL $\Delta^{16}$-20 ($\alpha$ AND $\beta$)-HYDROPEROXIDES
William P. Schneider and John C. Babcock, Kalamazoo, Mich., assignors to The Upjohn Company, Kalamazoo, Mich., a corporation of Delaware
No Drawing. Filed Aug. 30, 1963, Ser. No. 305,870
20 Claims. (Cl. 260—239.55)

This invention relates to the application of the photosensitized oxygenation reaction to $\Delta^{17(20)}$-steroidal olefins (I) to produce the corresponding new $\Delta^{16}$-20 ($\alpha$ and $\beta$)-hydroperoxides (II) and the novel conversion of these (II) to the corresponding valuable steroidal $\Delta^{16}$-20-ketones (III) and $\Delta^{16}$-20 ($\alpha$ and $\beta$)-hydroxides (IV).

The novel compounds of this invention and processes for the preparation thereof are illustratively represented by the following sequence of formulae wherein the Roman numerals therebeneath correspond with those above:

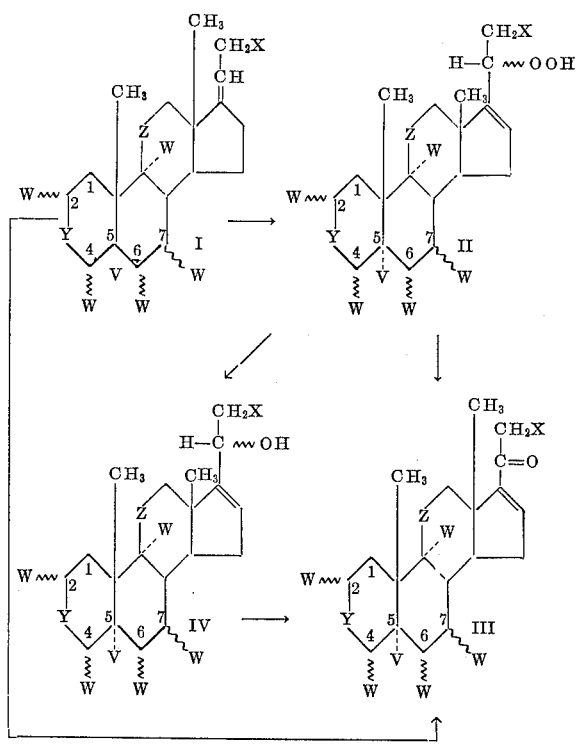

wherein the 1(2), 4(5) and 6(7)-carbon atom linkages are selected from the group consisting of single bonds and double bonds; ⧛ is a generic expression denoting $\alpha$- and $\beta$-bonds and mixtures thereof; V is selected from the group consisting of hydrogen and hydroxy, with the proviso that V is not present when the 4(5)-carbon atom linkage is a double bond; W is selected from the group consisting of hydrogen, methyl, chlorine and fluorine; X is selected from the group consisting of hydrogen, hydroxy and the acyloxy radical of an organic carboxylic acid containing from one to twelve carbon atoms, inclusive; Y is selected from the group consisting of the $\alpha$-hydroxymethylene radical

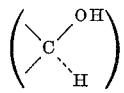

the $\beta$-hydroxymethylene radical

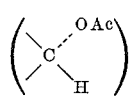

the $\alpha$-acyloxymethylene radical $$\left(\begin{array}{c} \diagdown_C \diagup^{OAc} \\ \diagup \diagdown_H \end{array}\right)$$

wherein Ac is the acyl radical of an organic carboxylic acid containing from one to twelve carbon atoms, inclusive, the $\beta$-acyloxymethylene radical $$\left(\begin{array}{c} \diagdown_C \diagup^{OAc} \\ \diagup \diagdown_H \end{array}\right)$$

wherein Ac has the same meaning as above, the carbonyl radical ($>C=O$) and an alkylene ketal radical of the formula $$\diagdown_C \diagup^{O-(CH_2)_n}_{O-CH-R}$$

wherein $n$ is selected from the group consisting of the integers one and two and R is selected from the group consisting of hydrogen and a lower-alkyl radical containing from one to six carbon atoms, inclusive; when Y is a carbonyl radical, the 1(2), 4(5), 6(7) and 9(11)-carbon atom linkages are selected from the group consisting of single and double bonds; when Y is other than a carbonyl radical, the 1(2), 4(5), 6(7) and 9(11)-carbon atom linkages are single bonds; Z is selected from the group consisting of the methylene radical ($>CH_2$), the $\alpha$-hydroxymethylene radical, the $\beta$-hydroxymethylene radical, the carbonyl radical and when W is selected from the group consisting of chlorine and fluorine, Z is additionally selected from the group consisting of chloromethylene and fluoromethylene; Z and W together constitute a 9(11)-double bond.

The novel compounds of this invention embraced by Formulae II, III and IV of the above flow-sheet possess valuable pharmacological properties, particularly anti-inflammatory activity. This property renders them useful in the treatment of various inflammatory conditions of the skin, eyes, respiratory tract, bones and internal organs due to viral or bacterial infections, contact dermatitis, allergic reactions and rheumatoid arthritis. The compounds of the aforesaid formulae are also useful as intermediates in the preparation of a wide variety of physiologically highly active and therapeutically valuable anti-inflammatory compounds substituted at the 16-position of the steroid nucleus, e.g., the appropriate $\Delta^{16}$-20-ketones embraced by Formula III, derived from the corresponding steroids of Formulae I, II or IV, can be conveniently converted by known methods to highly effective anti-inflammatory medicaments such as $9\alpha$-fluoro-$11\beta,16\alpha,17\alpha,21$-tetrahydroxy - 1,4 - pregnadiene-3,20-dione (triamcinolone) and its corresponding $6\alpha$-fluoro-analogue, i.e., as disclosed in J. Amer. Chem. Soc. 78, 5693 (1956) and ibid. 82, 3399 (1960), respectively. The latter is especially valuable where long-term anti-inflammatory therapy is necessary, inasmuch as its "calcium sparing" property prevents depleting the bones of calcium and consequently avoids osteoporosis which results from continued administration of certain other commonly employed corticoids.

The compounds of the present invention can be prepared and administered to mammals, birds, humans and animals in a wide variety of oral and parenteral dosage forms, singly or in a mixture with other coacting compounds. They can be associated with a carrier which can be a solid material or liquid, in which the compound is dissolved, dispersed or suspended. The solid compositions can take the form of tablets, powders, capsules, or the like, preferably in unit dosage forms for simple administration of precise dosage.

Steroidal $\Delta^{16}$-20-ketones are usually obtained from plant sapogenins (see Fieser and Fieser, "Steroids," page 547 et seq., Reinhold, New York, 1959), making them readily available, but at a very early and not necessarily convenient stage in cortical synthesis. For many purposes, it would be desirable to be able to introduce the $\Delta^{16}$-20-keto system much later in the synthetic scheme; also it would be advantageous to be independent of plant sources for these intermediates, i.e., those embraced by Formula III. Dehydration of 17α-hydroxy-20-ketosteroids or their ketone derivatives (such as semi-carbazones) has been carried out by several methods, e.g., J. Amer. Chem. Soc. 78, 5693 (1956); ibid. 77, 1028 (1955); ibid. 75, 4830 (1953); U.S. Patent 3,082,219; South African application No. 5054/59. However, the yields obtained in employing these processes are usually poor in comparison with those of the present process.

The photosensitized oxygenation of a variety of olefins yielding unsaturated hydroperoxides has been extensively studied by Schenk and his co-workers; no reaction occurs if the olefin lacks allylic hydrogens, or if sensitizer, irradiation or oxygen is excluded. A comprehensive review of this reaction, containing numerous references, by the former appears in Angew. Chem. 69, 579 (1957).

The following flow-sheet of partial formulae showing the arrangement of substituents attached to the respective D-rings of the steroid nuclei, illustrates the novel compounds and process of this invention:

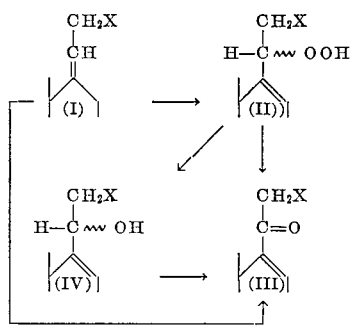

wherein X and ⌇ have the same meanings as those given therefor following the flow-sheet in column 1.

As indicated in the flow-sheet directly above, the compounds of Formula III can be prepared (1) directly from the corresponding starting materials (I) by a "one-pot" process, or (2) by dehydration of the isolated hydroperoxy intermediates (II) resulting from the photosensitized oxygenation of the compounds of Formula I. When the $\Delta^{16}$-20-ketones (III) are prepared directly from the $\Delta^{17(20)}$-steroidal olefins (I), the $\Delta^{16}$-20-hydroperoxides (II) are not separated from the reaction mixture, but a suitable dehydrating agent is added thereto and after an appropriate period of time has elapsed to permit the reaction to be completed, the compounds of Formula III are recovered. The $\Delta^{16}$-20-ketones (III) can be produced by still another method (3), namely, by reduction of the isolated corresponding hydroperoxides (II) (e.g., by reaction with Raney nickel containing adsorbed hydrogen) to yield the corresponding $\Delta^{16}$-20-hydroxides (IV), followed by their oxidation (e.g., by reaction with activated manganese dioxide) to give the appropriate steroid of Formula III.

The starting materials (I) for this invention can be prepared by employing the procedures set forth in U.S. Patent 2,781,343, namely, by reduction (e.g., by reaction with lithium aluminum hydride) of the corresponding cis Favorskii esters represented by the Formula b

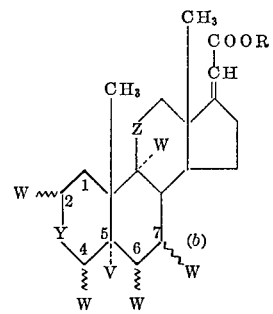

wherein R is a lower-alkyl radical containing from one to eight carbon atoms, inclusive, and 1(2), 4(5), 6(7), ⌇, V, W, Y and Z have the same meanings as those given therefor following the flow-sheet in column 1. The compounds embraced by Formula b are in turn prepared in the manner disclosed in U.S. Patent 2,790,814 from the corresponding compounds of the Formula a

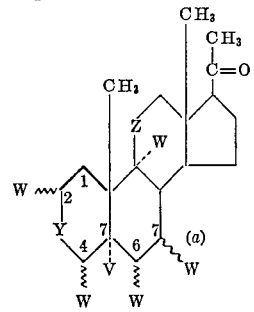

wherein 1(2), 4(5), 6(7), ⌇, V, W, Y and Z have the same meanings as above.

Representative compounds comprehended within Formula b include the following:

(1) methyl 9α-fluoro-3-keto-11β-hydroxy-4,17(20)-pregnadien-21-oate, (2) methyl-2-methyl-3-keto-11β-hydroxyl-1,4,17(20)-pregnatrien-21-oate, (3) methyl 4-methyl-3-keto-9α-fluoro-11β-hydroxy-4,17(20)-pregnadien-21-oate, (4) methyl 6α-methyl-3,11-diketo-9α-chloro-4,17(20)-pregnadiene-21-oate, (5) methyl 4-methyl-3-keto-4,9(11),17(20)-pregnatrien-21-oate, (6) methyl 2,6α-dimethyl-3-keto-9α-fluoro-11β-hydroxy-1,4,17(20)-pregnatrien-21-oate, (7) methyl 3β,11α-dihydroxy-5α-pregn-17(20)-en-21-oate, (8) methyl 3α-hydroxy-5β-pregn-17(20)-en-21-oate, (9) methyl 6,9α-difluoro-3-keto-11β-hydroxy-1,4,6,17(20)-pregnatetraen-21-oate,

(10) methyl 2,6α-difluoro-3-keto-1,4,17(20)-pregnatrien-21-oate,

(11) methyl 7α-methyl-3-keto-4,17(20)-pregnadien-21-oate,

(12) methyl 2,9α-difluoro-3,11-diketo-1,4,17(20)-pregnatrien-21-oate,

(13) methyl 4-fluoro-2α,6α-dimethyl-3-keto-1,4,17(20)-pregnatrien-21-oate,

(14) methyl 2α,4,6α-trimethyl-3-keto-11β-hydroxy-4,17(20)-pregnadien-21-oate,

(15) methyl 6α,9α-difluoro-2,4-dimethyl-3-keto-11β-hydroxy-1,4,17(20)-pregnadien-21-oate,

(16) methyl 3,11-diketo-4,17(20)-pregnadien-21-oate,

(17) methyl 3-ethylenedioxy-5α-hydroxy-6β-methyl-11-keto-17(20)-pregnen-21-oate,

(18) methyl 3-(2,2-dimethylpropylenedioxy)-5α-hydroxy-6β-methyl-11-keto-17(20)-pregnen-21-oate and

(19) methyl 3-ethylenedioxy-5α-hydroxy-6β-fluoro-11-keto-17(20)-pregnen-21-oate.

In this application unless specifically designated as cis or trans, the CH₂X group attached to the double bonded C–20 carbon atom of the starting compounds of Formula I includes both the cis and trans configuration and/or mixtures thereof.

*a.* PHOTOSENSITIZED OXYGENATION OF $\Delta^{17(20)}$-STEROIDAL OLEFINS (I)→$\Delta^{16}$-20 ($\alpha$ AND $\beta$)-HYDROPEROXIDES (II)

In carrying out the photosensitized oxygenation of the compounds of Formula I, those wherein X at the 21-position is acyloxy react more slowly than their 21-hydrogen and 21-hydoxy counterparts in producing the corresponding hydroperoxides (II). The 21-desoxy compounds of Formula I are prepared by reduction of the corresponding 21-acylates (I), e.g., by reaction with sodium and liquid ammonia in the manner disclosed in the first paragraph of Example 8, below. Both the cis and trans compounds of Formula I are reactive.

The preferred photosensitizer is hematoporphyrin, but dyes such as the eosins, methylene blue and Rose Bengal have been found satisfactory. Advantageously, the light employed is a conventional fluorescent lamp surrounded by a glass jacket containing the steroid solution. Such an arrangement can be modified and adapted to provide a continuous flow process for large scale conversions; e.g., in vessels of large volume, irradiation can be accomplished by inserting the fluorescent lamp into glass wells or positioning them against glass ports. However, the process of the invention is not limited to the use of this particular light source. Thus, any light source producing radiation in the region of maximum absorption of the photosensitizer can be used; for example, hematoporphyrin having maximum absorption at 377 m$\mu$, Rose Bengal at 340 and 550 m$\mu$ and Eosin Y at 328 and 515 m$\mu$ can all be satisfactorily employed with a fluorescent lamp as a light source. Sun light can also be used for this purpose, as well as incandescent lamps and carbon arc lights.

The preferred solvents are pyridine and dimethylformamide; organic bases, such as picolines and collidines, are also satisfactory. Inert solvents such as benzene and ethanol can also be used.

The optimum temperature for the photosensitized oxygenation of the starting steroids (I) was found to be between about 25° C. to about 40° C., but temperatures between about −50° C. and about 80° C. are also satisfactory.

The time required for conversion of the compounds of Formula I to the corresponding 20 ($\alpha$ and $\beta$)-hydroperoxides (II) by the photosensitized oxygenation reaction depends on several factors, namely, the rate of oxygen bubbling through the reaction mixture, the amount of photosensitizer present and the amount of substrate (I). Oxygen is usually bubbled through the reaction mixture throughout the course of the conversion; air can also be used. Pressure vessels charged with oxygen and illuminated either from within or through glass ports can also be used. The progress of the reaction is followed by taking aliquots for thin-layer chromatography and terminating the reaction when the starting material (I) is mainly converted to the hydroperoxide (II). The extent of the conversion can also be assessed by titration of the hydroperoxide formed, or by measuring the absorption of oxygen in a closed system. Under the conditions disclosed in the examples, below, the time varied between about 1 and about 24 hours, with the starting materials (I) wherein X is hydroxy requiring between about 5 and about 7 hours; those wherein X is hydrogen about 1 hour; starting steroids (I) wherein X is acyloxy required longer reaction periods to produce the hydroperoxide (II).

Isolated double bonds in the steroid starting material other than at the 17(20)-position, if not conjugated with a keto group, are also amenable to the photosensitized oxygenation reaction productive of their corresponding hydroperoxides. For examples, by utilizing the procedures disclosed above, the $\Delta^1$, $\Delta^2$, $\Delta^3$, $\Delta^4$, $\Delta^5$, $\Delta^6$, $\Delta^7$, $\Delta^{9(11)}$, $\Delta^{12}$, $\Delta^{14}$, $\Delta^{15}$ and $\Delta^{16}$-bonds are susceptible to this conversion, several of which are shown in the succeeding three paragraphs; in addition the subsequent dehydration of the hydroperoxide to its corresponding ketone (in the manner of *b*, below) is also set forth.

(1)
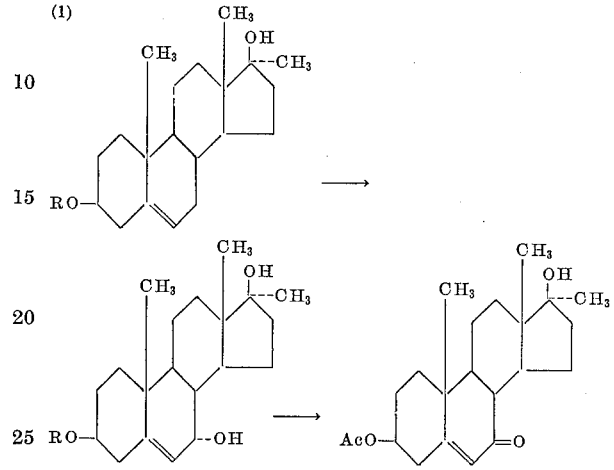

wherein R is selected from the group consisting of hydrogen and Ac, and Ac has the same meaning as that given therefor following the flow-sheet on page 1. The $\Delta^6$-starting material can be prepared from $\Delta^5$-steroids by the method disclosed in J. Amer. Chem. Soc. 78, 6269 (1956). The $\Delta^5$-7-keto product can be converted to 7,17$\alpha$-dimethyl-17$\beta$-hydroxy-4,6-androstadien-3-one in the manner disclosed in U.S. Patent 3,029,263.

(2)
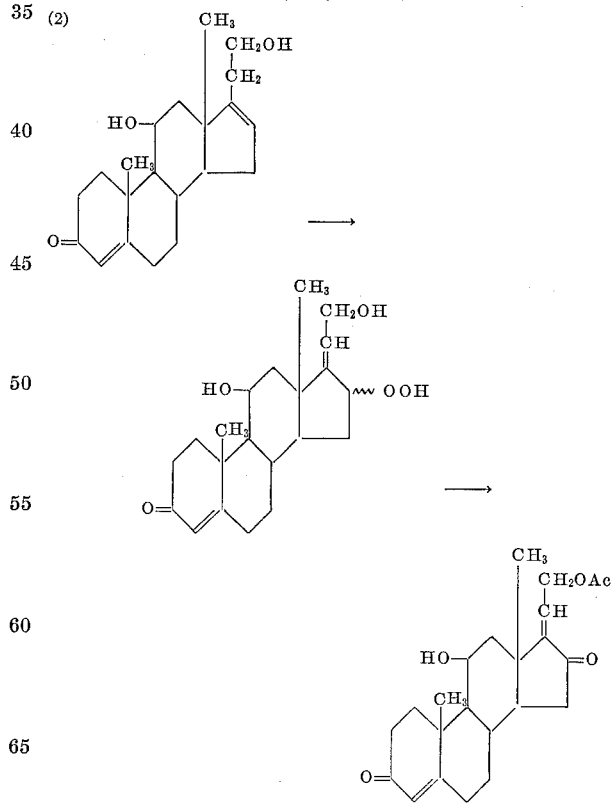

wherein Ac and $\sim$ have the same meanings as those given therefor following the flow-sheet in column 1. The starting material is prepared by reaction of 3,11-diketo-4,16-pregnadiene-21-carboxylic acid with diazomethane to yield the corresponding 21-methyl ester. Reaction of the thus produced ester with ethylene glycol in the presence of p-toluenesulfonic acid gives its corresponding 3-ketal derivative; reduction of the ketalized compound with lithium aluminum hydride produces the corresponding 11β,21-dihydroxy compound; hydrolysis of the 3-ketal group of the thus produced dihydroxide restores the 3-keto-Δ⁴-system to yield the above starting compound. The above 16-keto-Δ¹⁷⁽²⁰⁾-product, following its selective reduction to yield the corresponding 16-hydroxide, by utilizing the processes disclosed in U.S. Patents 2,769,823; 2,769,825; 2,971,886; 2,852,511; 2,923,722; 2,924,612 and 2,957,894, can be employed in the preparation of therapeutically effective 16-substituted corticoid analogues such as 9α-fluoro-11β,16α,17α,21-tetrahydroxy-1,4-pregnadiene-3,20-dione.

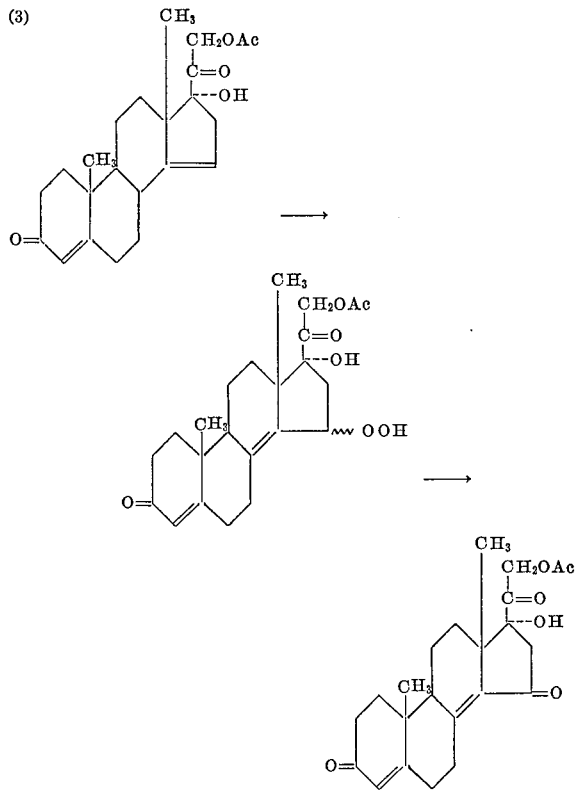

wherein Ac and ∿ have the same meanings as those given therefor following the flow-sheet in column 1. The starting compound is prepared in the manner disclosed in J. Amer. Chem. Soc. 77, 4684 (1955).

Following the procedures indicated in the sections designated 1, 2 and 3, immediately above, but replacing as starting materials for those disclosed therein, steroids additionally substituted, e.g., by methyl, chloro and fluoro functions, at other appropriate positions such as at the 2, 4, 6, 9, 11, 15, etc. carbon atoms of the steroid nucleus, yields the corresponding hydroperoxides and ketones.

b. DEHYDRATION OF Δ¹⁶-20 (α AND β)-HYDROPEROXIDES (II)→Δ¹⁶-20-KETONES (III)

This step is accomplished by employing usual acylating conditions, and if a 21-hydroxyl (or other easily acylated hydroxyl) is present, it is also converted to the acyloxy derivative. Dissolving the hydroperoxide (II) in acetic anhydride and pyridine and allowing the reaction mixture to stand at room temperature for a period of about 15 hours, or warming for a short time on a steam bath, readily yields the corresponding Δ¹⁶-20-ketone (III). Additional acylating agents can be used, e.g., acyl anhydrides other than acetic anhydride, acid chlorides and sulfonyl chlorides such as p-toluenesulfonyl chloride. Tertiary organic bases other than pyridine can be utilized, e.g., collidines and triethylamine. Bases such as sodium hydroxide and piperidine are also effective in converting the hydroperoxide (II) to its Δ¹⁶-20-ketone (III); this method would require an additional acylation step to provide the Δ¹⁶-20-keto-21-acylates (III).

c. CONVERSION OF Δ¹⁷⁽²⁰⁾-STEROIDAL OLEFINS (I)→Δ¹⁶-20-KETONES (III) [WITHOUT ISOLATION OF Δ¹⁶-20 (α AND β)-HYDROPEROXIDES (II)]

The two steps of the above process of this invention, namely, (a) the photosensitized oxygenation of the Δ¹⁷⁽²⁰⁾-olefins (I) and (b) conversion by dehydration of the resulting intermediate hydroperoxide (II) to the corresponding Δ¹⁶-20-ketone (III), can be effected without isolating the hydroperoxide (II). Thus, acetic anhydride or one of the acylating agents disclosed in b, above, is added directly to the pyridine solution containing the intermediate Δ¹⁶-20-hydroperoxide (II) resulting from irradiation and oxygenation of the starting Δ¹⁷⁽²⁰⁾-olefin (I), and after standing at room temperature about 15 hours or warming on the steam bath the Δ¹⁶-20-keto 21-acetate product (III) is isolated in about 50% overall yield, as described in Example 5, below.

d. REDUCTION OF Δ¹⁶-20 (α AND β)-HYDROPEROXIDES (II)→Δ¹⁶-20 (α AND β)-HYDROXIDES (IV)

This conversion is readily carried out under conventional catalytic hydrogenation conditions, or by employing Raney nickel as the reducing agent, or by chemical reducing agents such as potassium iodide in aqueous acid solutions.

e. OXIDATION OF Δ¹⁶-20 (α AND β)-HYDROXIDES (IV)→Δ¹⁶-20-KETONES (III)

This conversion is accomplished smoothly by utilizing conventional oxidizing agents, e.g., activated manganese dioxide, prepared as described by Attenburrow et al., J. Chem. Soc. 1094 (1952).

All of the compounds embraced by Formulae II, III and IV can be isolated from their reaction mixtures by conventional means, for example, when a water-miscible solvent is used, by pouring the reaction mixture into water and separating the resulting precipitate by filtration or by extraction with water-immiscible solvents. Additional purification of the product can be accomplished by conventional means, for example, by elution chromatography from an adsorbent column with a suitable solvent such as acetone, methanol, dilute methanol, ethanol, ether, methylene chloride and Skellysolve B (hexanes), mixtures and combinations of these solvents; also by gradient elution chromatography from an adsorbent column with a suitable mixture of solvents, such as methylene chloride-Skellysolve B, acetone-Skellysolve B, and the like.

*Example 1.—20α-hydroperoxy-11β,21-dihydroxy-1,4,16-pregnatrien-3-one (II)*

A solution of 2 g. of 11β,21-dihydroxy-1,4,17(20)-cis-pregnatrien-3-one (I) (prepared in the manner disclosed in U.S. Patent 2,781,343) and 40 mg. of hematoporphyrin in 125 ml. of pyridine was irradiated with a fluorescent lamp while oxygen was bubbled therethrough. After a period of about 6 to 7 hours, thin-layer chromatography showed that no starting steroid remained, being replaced by a major product having nearly the same mobility. The solution was poured into water, extracted with ethyl acetate and the extracts washed successively with water, dilute hydrochloric acid and sodium bicarbonate solution. The pooled ethyl acetate extracts were dried over sodium sulfate and the solvent then evaporated. The partly crystalline residue was triturated with acetone and filtered to give 1.86 g. (54% yield) of crystalline product (II). This material liberated iodine from aqueous, acidified potassium iodide solution. A sample was recrystallized twice from a mixture of methanol and water to give colorless rods of 20α-hydroperoxy-11β,21-dihydroxy-1,4,16-pregnatrien-3-one (II) with a melting point of 180 to 186° C. (decomposition with evolution of gas).

*Anal.*—Calcd. for $C_{21}H_{28}O_5$: C, 69.97; H, 7.83. Found: C, 69.81; H, 8.07.

This material showed infrared absorptions at 3400, 3350, 3150, 1655, 1620, 1600, 1225, 1175, 1095, 1060 and 1040 cm.$^{-1}$; its nuclear magnetic resonance spectrum was consistent with this structure.

The mother liquor from the above preparation upon removal of solvent yields a residue containing 20β-hydroperoxy - 11β,21 - dihydroxy - 1,4,16 - pregnatrien-3-one (II).

Example 2

In this example certain of the new compounds of this invention are prepared by a novel process therefor, which is illustratively represented by the following reaction sequence:

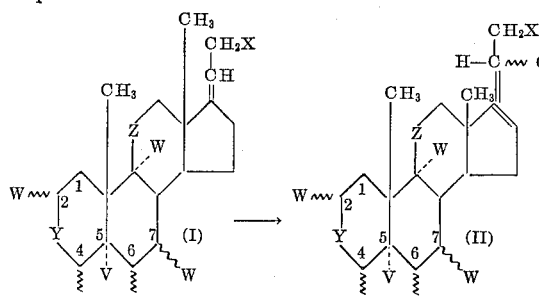

wherein 1(2), 4(5), 6(7), ∿, V, W, X, Y and Z have the same meanings as those given therefor following the flow-sheet in column 1.

Following the procedure of Example 1 but substituting for 11β,21-dihydroxy-1,4,17(20)-cis-pregnatrien-3-one (I) the following representative starting materials (prepared as in U.S. Patent 2,781,343):

(1) 11β,21-dihydroxy-1,4,17(20)-pregnatrien-3-one 21-acetate (I),
(2) 11β,21-dihydroxy-4,17(20)-pregnadien-3-one (I),
(3) 21-hydroxy-1,4,17(20)-pregnatriene-3,11-dione (I),
(4) 21-hydroxy-4,17(20)-pregnadiene-3,11-dione (I),
(5) 21-hydroxy-4,17(20)-pregnadiene-3,11-dione 21-acetate (I),
(6) 11α,21-dihydroxy-1,4,17(20)-pregnatrien-3-one (I),
(7) 21-hydroxy-4,17(20)-pregnadien-3-one (I),
(8) 21-hydroxy-1,4,17(20)-pregnatrien-3-one 21-acetate (I),
(9) 11β,21-dihydroxy-17(20)-pregnen-3-one (I),
(10) 21-hydroxy-2α-methyl-17(20)-pregnen-3-one (I),
(11) 3β,21-dihydroxy-17(20)-pregnene (I),
(12) 3α,21-dihydroxy-17(20)-pregnene (I),
(13) 3β,11β,21-trihydroxy-17(20)-pregnene (I),
(14) 2-fluoro-11β,21-dihydroxy-1,4,17(20)-pregnatrien-3-one (I),
(15) 2-methyl-11β,21-dihydroxy-1,4,17(20)-pregnatrien-3-one (I),
(16) 4-fluoro-11β,21-dihydroxy-1,4,17(20)-pregnatrien-3-one 21-acetate (I),
(17) 4-methyl-11β,21-dihydroxy-1,4,17(20)-pregnatrien-3-one (I),
(18) 6α-fluoro-11β,21-dihydroxy-4,17(20)-pregnadien-3-one (I),
(19) 6α-methyl-11β,21-dihydroxy-1,4,17(20)-pregnatrien-3-one (I),
(20) 7α-methyl-11β,21-dihydroxy-4,17(20)-pregnadien-3-one (I),
(21) 7α-fluoro-11β,21-dihydroxy-1,4,17(20)-pregnatrien-3-one (I),
(22) 9α-fluoro-11β,21-dihydroxy-4,17(20)-pregnadien-3-one (I),
(23) 9α-fluoro-21-hydroxy-1,4,17(20)-pregnatrien-3,11-dione (I),
(24) 6α,9α-difluoro-11β,21-dihydroxy-1,4,17(20)-pregnatrien-3-one (I),
(25) 6α,9α-difluoro-21-hydroxy-4,17(20)-pregnadiene-3,11-dione (I),
(26) 6,9α-difluoro-11β,21-dihydroxy-1,4,6,17(20)-pregnatetrien-3-one (I),
(27) 9α-fluoro-21-hydroxy-6α-methyl-1,4,17(20)-pregnatriene-3,11-dione (I),
(28) 6α-fluoro-2α-methyl-11β,21-dihydroxy-1,4,17(20)-pregnatrien-3-one (I),
(29) 2α,6α-dimethyl-11β,21-dihydroxy-4,17(20)-pregnadiene-3-one (I),
(30) 2,6α-dimethyl-9α-fluoro-11β,21-dihydroxy-1,4,17(20)-pregnatrien-3-one (I),
(31) 3-(2,2-dimethylpropylenedioxy)-6β-methyl-5α,11β,21-trihydroxy-17(20)-pregnene (I),
(32) 3β,11β,21-trihydroxy-17(20)-pregnene 3,21-diacetate (I),
(33) 3β,21-dihydroxy-17(20)-pregnen 3-acetate (I),
(34) 3α,21-dihydroxy-17(20)-pregnen 3-acetate (I),
(35) 2,9α-difluoro-11β,21-dihydroxy-6α-methyl-1,4,17(20)-pregnatrien-3-one (I),
(36) 11β,21-dihydroxy-5,17(20)-pregnadien-3-one 3-ethylene ketal (I),
(37) 21-hydroxy-4,9(11),17(20)-pregnatrien-3-one (I),
(38) 6α-fluoro-11β,21-dihydroxy-9α-methyl-4,17(20)-pregnadien-3-one (I),
(39) 11β,21-dihydroxy-6α,9α-dimethyl-1,4,17(20)-pregnatrien-3-one 21-acetate (I),
(40) 6α,9α-dichloro-21-hydroxy-1,4,17(20)-pregnatriene-3,11-dione 21-acetate (I),
(41) 6α-chloro-21-hydroxy-4,9(11),17(20)-pregnatrien-3-one (I),
(42) 11β,21-dihydroxy-2α,6α,9α-trifluoro-4,17(20)-pregnadien-3-one (I),
(43) 3-ethylenedioxy-6β-fluoro-5α,11β,21-trihydroxy-17(20)-pregnene (I) and
(44) 3-ethylenedioxy-6β-methyl-5α,11β,21-trihydroxy-17(20)-pregnene (I), yields, respectively, (1) 20α-hydroperoxy-11β,21-dihydroxy-1,4,16-pregnatrien-3-one 21-acetate (II),
(2) 20α-hydroperoxy-11β,21-dihydroxy-4,16-pregnadien-3-one (II),
(3) 20α-hydroperoxy-21-hydroxy-1,4,16-pregnatriene-3,11-dione (II),
(4) 20α-hydroperoxy-21-hydroxy-4,16-pregnadiene-3,11-dione (II),
(5) 20α-hydroperoxy-21-hydroxy-4,16-pregnadiene-3,11-dione 21-acetate (II),
(6) 20α-hydroperoxy-11α,21-dihydroxy-1,4,16-pregnatrien-3-one (II),
(7) 20α-hydroperoxy-21-hydroxy-4,16-pregnadien-3-one (II),
(8) 20α-hydroperoxy-21-hydroxy-1,4,16-pregnatrien-3-one (II),
(9) 20α-hydroperoxy-11β,21-dihydroxy-1,4,16-pregnatrien-3-one 21-acetate (II),
(10) 20α-hydroperoxy-21-hydroxy-2α-methyl-16-pregnen-3-one (II),
(11) 20α-hydroperoxy-3β,21-dihydroxy-16-pregnene (II),
(12) 20α-hydroperoxy-3α,21-dihydroxy-16-pregnene (II),
(13) 20α-hydroperoxy-3β,11β,21-trihydroxy-16-pregnene (II),
(14) 20α-hydroperoxy-2α-fluoro-11β,21-dihydroxy-1,4,16-pregnatrien-3-one (II),
(15) 20α-hydroperoxy-2α-methyl-11β,21-dihydroxy-1,4,16-pregnatrien-3-one (II),
(16) 20α-hydroperoxy-4α-fluoro-11β,21-dihydroxy-1,4,16-pregnatrien-3-one 21-acetate (II),
(17) 20α-hydroperoxy-4α-methyl-11β,21-dihydroxy-1,4,16-pregnatrien-3-one (II),
(18) 20α-hydroperoxy-6α-fluoro-11β,21-dihydroxy-4,16-pregnadien-3-one (II),

(19) 20α-hydroperoxy-6α-methyl-11β,21-dihydroxy-1,4,16-pregnatrien-3-one (II),
(20) 20α-hydroperoxy-7α-methyl-11β,21-dihydroxy-4,16-pregnadien-3-one (II),
(21) 20α-hydroperoxy-7α-fluoro-11β,21-dihydroxy-1,4,16-pregnatrien-3-one (II),
(22) 20α-hydroperoxy-9α-fluoro-11β,21-dihydroxy-4,16-pregnadien-3-one (II),
(23) 20α-hydroperoxy-9α-fluoro-21-hydroxy-1,4,16-pregnatriene-3,11-dione (II),
(24) 20α-hydroperoxy-6α,9α-difluoro-11β,21-dihydroxy-1,4,16-pregnatrien-3-one (II),
(25) 20α-hydroperoxy-6α,9α-difluoro-21-hydroxy-4,16-pregnadien-3,11-dione (II),
(26) 20α-hydroperoxy-6α,9α-difluoro-11β,21-dihydroxy-1,4,6,16-pregnatetraen-3-one (II),
(27) 20α-hydroperoxy-9α-fluoro-21-hydroxy-6α-methyl-1,4,16-pregnatriene-3,11-dione (II),
(28) 20α-hydroperoxy-6α-fluoro-2α-methyl-11β,21-dihydroxy-1,4,16-pregnatrien-3-one (II),
(29) 20α-hydroperoxy-2α,6α-dimethyl-11β,21-dihydroxy-4,16-pregnadien-3-one (II),
(30) 20α-hydroperoxy-2α,6α-dimethyl-9α-fluoro-11β,21-dihydroxy-1,4,16-pregnatrien-3-one (II),
(31) 20α-hydroperoxy-3-(2,2-dimethylpropylenedioxy)-6β-methyl-5α,11β,21-trihydroxy-16-pregnene (II),
(32) 20α-hydroperoxy-3β,11β,21-trihydroxy-16-pregnene 3,21-diacetate (II),
(33) 20α-hydroperoxy-3β,21-dihydroxy-16-pregnen 3-acetate (II),
(34) 20α-hydroperoxy-3α,21-dihydroxy-16-pregnen 3-acetate (II),
(35) 20α-hydroperoxy-2α,9α-difluoro-11β,21-dihydroxy-6α-methyl-1,4,16-pregnatrien-3-one (II),
(36) 20α-hydroperoxy-11β,21-dihydroxy-5,16-pregnadien-3-one 3-ethylene ketal (II),
(37) 20α-hydroperoxy-21-hydroxy-4,9(11),16-pregnatrien-3-one (II),
(38) 20α-hydroperoxy-6α-fluoro-11β,21-dihydroxy-9α-methyl-4,16-pregnadien-3-one (II),
(39) 20α-hydroperoxy-11β,21-dihydroxy-6α,9α-dimethyl-1,4,16-pregnatrien-3-one 21-acetate (II),
(40) 20α-hydroperoxy-6α,9α-dichloro-21-hydroxy-1,4,16-pregnatriene-3,11-dione 21-acetate (II),
(41) 20α-hydroperoxy-6α-chloro-21-hydroxy-4,9(11),16-pregnatrien-3-one (II),
(42) 20α-hydroperoxy-11β,21-dihydroxy-2α,6α,9α-trifluoro-4,16-pregnadien-3-one (II),
(43) 20α-hydroperoxy-3-ethylenedioxy-6β-fluoro-5α,11β,21-trihydroxy-16-pregnene (II) and
(44) 20α-hydroperoxy-3-ethylenedioxy-6β-methyl-5α,11β,21-trihydroxy-16-pregnen (II).

The starting materials represented by Formula I, above, wherein X is hydrogen, are prepared from their corresponding 21-acylates (I) by reduction of the 21-oxygenated substituent, e.g., with sodium metal dissolved in liquid ammonia. In utilizing this method, those 21-acylates of Formula I wherein Y is keto must have the 3-substituent protected, e.g., by converting it to its 3-ketal prior to reduction with sodium in liquid ammonia, and following reduction removing the 3-ketal group by hydrolysis, e.g., under mildly acidic conditions, to give the desired 3-keto-Δ⁴-21-desoxy compound (I).

Following the procedure of Example 1 but substituting for 11β,21-dihydroxy-1,4,17(20)-cis-pregnatrien-3-one (I) the following representative 21-desoxy starting materials (I):

(45) 11β-hydroxy-1,4,17(20)-pregnatrien-3-one (I),
(46) 11β-hydroxy-4-17(20)-pregnadien-3-one (I),
(47) 1,4,17(20)-pregnatriene-3,11-dione (I),
(48) 4,17(20)-pregnadiene-3,11-dione (I),
(49) 4,6,17(20)-pregnatriene-3,11-dione (I),
(50) 11α-hydroxy-1,4,17(20)-pregnatriene-3-one (I),
(51) 4,17(20)-pregnadien-3-one (I),
(52) 1,4,6,17(20)-pregnatetraen-3-one (I),
(53) 11β-hydroxy-17(20)-pregnen-3-one (I),
(54) 2α-methyl-17(20)-pregnen-3-one (I),
(55) 3β-hydroxy-17(20)-pregnene (I),
(56) 3α-hydroxy-17(20)-pregnene (I),
(57) 3β-11β-dihydroxy-17(20)-pregnene (I),
(58) 2α-fluoro-11β-hydroxy-4,17(20)-pregnadien-3-one (I),
(59) 2-methyl-11β-hydroxy-1,4,17(20)-pregnatrien-3-one (I),
(60) 4-fluoro-11β-hydroxy-1,4,17(20)-pregnatrien-3-one (I),
(61) 4-methyl-4,17(20)-pregnadiene-3,11-dione (I),
(62) 6α-fluoro-11β-hydroxy-1,4,17(20)-pregnatrien-3-one (I),
(63) 6α-methyl-11β-hydroxy-4,17(20)-pregnadien-3-one (I),
(64) 7α-methyl-11β-hydroxy-1,4,17(20)-pregnatrien-3-one (I),
(65) 7α-fluoro-11β-hydroxy-4,17(20)-pregnadien-3-one (I),
(66) 9α-fluoro-11β-hydroxy-1,4,17(20)-pregnatrien-3-one (I),
(67) 9α-fluoro-4,17(20)-pregnadiene-3,11-dione (I),
(68) 6α,9α-difluoro-11β-hydroxy-4,17(20)-pregnadien-3-one (I),
(69) 6α,9α-difluoro-1,4,17(20)-pregnatriene-3,11-dione (I),
(70) 6,9α-difluoro-11β-hydroxy-4,6,17(20)-pregnatrien-3-one (I),
(71) 9α-fluoro-6α-methyl-4,17(20)-pregnadiene-3,11-dione (I),
(72) 6α-fluoro-2α-methyl-11β-hydroxy-4,17(20)-pregnadien-3-one (I),
(73) 2,6α-dimethyl-11β-hydroxy-1,4,17(20)-pregnatrien-3-one (I),
(74) 2α,6α-dimethyl-9α-fluoro-11β-hydroxy-4,17(20)-pregnadien-3-one (I),
(75) 3-(2,2-dimethylpropylenedioxy)-6β-methyl-5α,11β-dihydroxy-17(20)-pregnene (I),
(76) 3β,11β-dihydroxy-17(20)-pregnene 3-acetate (I),
(77) 3β-hydroxy-17(20)-pregnen 3-acetate (I),
(78) 3α-hydroxy-17(20)-pregnen 3-acetate (I),
(79) 2α,9α-difluoro-11β-hydroxy-6α-methyl-4,17(20)-pregnadien-3-one (I),
(80) 11β-hydroxy-1,5,17(20)-pregnatrien-3-one 3-ethylene ketal (I),
(81) 1,4,9(11),17(20)-pregnatetraen-3-one (I),
(82) 6α-fluoro-11β-hydroxy-9α-methyl-1,4,17(20)-pregnatrien-3-one (I),
(83) 6α,9α-dimethyl-4,17(20)-pregnadiene-3,11-dione (I),
(84) 6α,9α-dichloro-11β-hydroxy-4,17(20)-pregnadien-3-one (I),
(85) 6α-chloro-1,4,9(11),17(20)-pregnatetraen-3-one (I) and
(86) 11β-hydroxy-2,6α,9α-trifluoro-1,4,17(20)-pregnatrien-3-one (I),
yields, respectively,
(45) 20α-hydroperoxy-11β-hydroxy-1,4,16-pregnatrien-3-one (II),
(46) 20α-hydroperoxy-11β-hydroxy-4,16-pregnadien-3-one (II),
(47) 20α-hydroperoxy-1,4,16-pregnatriene-3,11-dione (II),
(48) 20α-hydroperoxy-4,16-pregnadiene-3,11-dione (II),
(49) 20α-hydroperoxy-4,6,16-pregnatriene-3,11-dione (II),
(50) 20α-hydroperoxy-11α-hydroxy-1,4,16-pregnatrien-3-one (II),
(51) 20α-hydroperoxy-4,16-pregnadien-3-one (II),
(52) 20α-hydroperoxy-1,4,6,16-pregnatetraen-3-one (II),
(53) 20α-hydroperoxy-11β-hydroxy-16-pregnen-3-one (II),
(54) 20α-hydroperoxy-2α-methyl-16-pregnen-3-one (II),

(55) 20α-hydroperoxy-3β-hydroxy-16-pregnene (II),
(56) 20α-hydroperoxy-3α-hydroxy-16-pregnene (II),
(57) 20α-hydroperoxy-3β,11β-dihydroxy-16-pregnene (II),
(58) 20α-hydroperoxy-2α-fluoro-11β-hydroxy-16-pregnen-3-one (II),
(59) 20α-hydroperoxy-2α-methyl-11β-hydroxy-1,4,16-pregnatrien-3-one (II),
(60) 20α-hydroperoxy-4α-fluoro-11β-hydroxy-1,4,16-pregnatrien-3-one (II),
(61) 20α-hydroperoxy-4α-methyl-4,16-pregnadiene-3-11-dione (II),
(62) 20α-hydroperoxy-6α-fluoro-11β-hydroxy-1,4,16-pregnatrien-3-one (II),
(63) 20α-hydroperoxy-6α-methyl-11β-hydroxy-4,16-pregnadien-3-one (II),
(64) 20α-hydroperoxy-7α-methyl-11β-hydroxy-1,4,16-pregnatrien-3-one (II),
(65) 20α-hydroperoxy-7α-fluoro-11β-hydroxy-4,16-pregnadien-3-one (II),
(66) 20α-hydroperoxy-11β-hydroxy-1,4,16-pregnatrien-3-one (II),
(67) 20α-hydroperoxy-9α-fluoro-4,16-pregnadiene-3,11-dione (II),
(68) 20α-hydroperoxy-6α,9α-difluoro-11β-hydroxy-4,16-pregnadien-3-one (II),
(69) 20α-hydroperoxy-6α,9α-difluoro-1,4,16-pregnatrien-3,11-dione (II),
(70) 20α-hydroperoxy-6α,9α-difluoro-11β-hydroxy-4,6,16-pregnatrien-3-one (II),
(71) 20α-hydroperoxy-9α-fluoro-6α-methyl-4,16-pregnadiene-3,11-dione (II),
(72) 20α-hydroperoxy-6α-fluoro-2α-methyl-11β-hydroxy-4,16-pregnadien-3-one (II),
(73) 20α-hydroperoxy-2α,6α-dimethyl-11β-hydroxy-1,4,16-pregnatrien-3-one (II),
(74) 20α-hydroperoxy-2α,6α-dimethyl-9α-fluoro-11β-hydroxy-4,16-pregnadien-3-one (II),
(75) 20-hydroperoxy-3-(2,2-dimethylpropylenedioxy)-6β-methyl-5α,11β-dihydroxy-16-pregnene (II),
(76) 20α-hydroperoxy-3β,11β-dihydroxy-16-pregnen 3-acetate (II),
(77) 20α-hydroperoxy-3β-hydroxy-16-pregnen 3-acetate (II),
(78) 20α-hydroperoxy-3α-hydroxy-16-pregnen 3-acetate (II),
(79) 20α-hydroperoxy-2α,9α-difluoro-11β-hydroxy-6α-methyl-4,16-pregnadien-3-one (II),
(80) 20α-hydroperoxy-11β-hydroxy-1,5,16,-pregnatrien-3-one 3-ethylene ketal (II),
(81) 20α-hydroperoxy-1,4,9(11),16-pregnatetraen-3-one (II),
(82) 20α-hydroperoxy-6α-fluoro-11β-hydroxy-9α-methyl-1,4,16-pregnatrien-3-one (II),
(83) 20α-hydroperoxy-6α,9α-dimethyl-4,16-pregnadiene-3,11-dione (II),
(84) 20α-hydroperoxy-6α,9α-dichloro-11β-hydroxy-4,16-pregnadien-3-one (II),
(85) 20α-hydroperoxy-6α-chloro-1,4,9(11),16-pregnatetraen-3-one (II) and
(86) 20α-hydroperoxy-11β-hydroxy-2α,6α,9α-trifluoro-1,4,16-pregnatrien-3-one (II).

The 20β-hydroperoxy compounds (II) corresponding otherwise to the 20α-hydroperoxides (II) produced in (1) to (86), above, are prepared in the manner disclosed in the last paragraph of Example 1.

The 20 (α and β)-hydroperoxides (II) can be prepared from both the cis and trans forms of the Δ¹⁷⁽²⁰⁾-starting materials of Formula I in the manner disclosed in Example 1.

*Example 3.—11β,21-dihydroxy-1,4,16-pregnatriene-3,20-dione 21-acetate (III)*

A solution of 250 mg. of crude crystalline 20α-hydroperoxy - 11β,21 - dihydroxy - 1,4,16 - pregnatrien - 3-one (II) (prepared as in Example 1) in 3 ml. of pyridine and 2 ml. of acetic anhydride was allowed to stand for a period of about 15 hours at room temperature. The solution was then warmed briefly from about 50 to about 60° C. on a steam bath then cooled and water added. The partly crystalline precipitate was extracted with ethyl acetate, washed with dilute hydrochloric acid, aqueous sodium bicarbonate solution, dried over sodium sulfate and the liquid evaporated to give a crystalline residue. The residue was recrystallized from a mixture of acetone and Skellysolve B to give light tan crystals weighing 153 mg. and melting at 200 to 208° C. This material had an infrared absorption and showed thin-layer chromatographic behavior identical to that of an authentic sample of 11β,21 - dihydroxy-1,4,16 - pregnatrien - 3,20 - dione 21-acetate (III) prepared by another process.

In order to determine how much of the product (III) was actually formed, the crystal and mother liquors were combined and chromatographed on 35 g. of Florisil (synthetic magnesium silicate) and eluted with mixtures of acetone and Skellysolve B containing between 5 and 30% of the latter solvent. A single crystalline peak from the column, totalling 222 mg. (83% of theoretical), was obtained; this was recrystallized from acetone-Skellysolve B to give two crops of colorless prisms of 11β,21-dihydroxy - 1,4,16 - pregnatriene - 3,20 - dione 21 - acetate (III). The first crop weighing 150 mg. had a melting point of 200 to 208° C. and the second (54 mg.) melted at 195 to 203° C.

Following the procedure of Example 3 but substituting for 20α - hydroperoxy - 11β,21 - dihydroxy - 1,4,16 - pregnatrien-3-one (II) the corresponding 20β-hydroperoxide (II), also yields 11β,21 - dihydroxy - 1,4,16 - pregnatrien-3,20-dione 21-acetate (III).

*Example 4*

In this example certain of the new compounds of this invention are prepared by a novel process therefor, which is illustratively represented by the following reaction sequence:

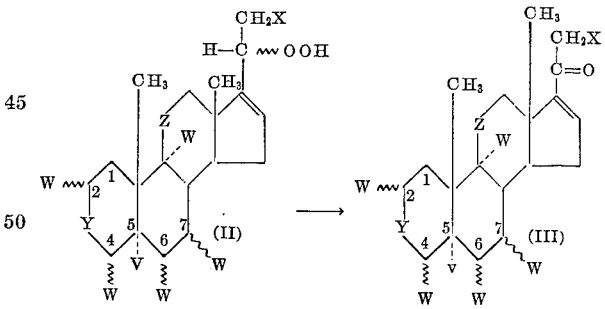

wherein 1(2), 4(5), 6(7), ⌇, V, W, X, Y and Z have the same meanings as those given therefor following the flow-sheet in column 1.

Following the procedure of Example 3 but substituting for 20α - hydroperoxy - 11β,21 - dihydroxy - 1,4,16-pregnatrien-3-one (II) the following representative starting materials:

(1) 20α-hydroperoxy-11β,21-dihydroxy-4,6,16-pregnatrien-3-one (II),
(2) 20α-hydroperoxy-11β,21-dihydroxy-4,16-pregnadien-3-one (II),
(3) 20α-hydroperoxy-21-hydroxy-1,4,16-pregnatriene-3,11-dione (II),
(4) 20α-hydroperoxy-21-hydroxy-4,16-pregnadiene-3,11-dione (II),
(5) 20α-hydroperoxy-21-hydroxy-4,6,16-pregnatriene-3,11-dione (II),
(6) 20α-hydroperoxy-11α,21-dihydroxy-1,4,16-pregnatrien-3-one (II),
(7) 20α-hydroperoxy-21-hydroxy-4,16-pregnadien-3-one (II), (8) 20α-hydroperoxy-21-hydroxy-1,4,16-pregnatrien-3-one (II),
(9) 20α-hydroperoxy-11β,21-dihydroxy-1,4,6,16-pregnatetraen-3-one (II),
(10) 20α-hydroperoxy-21-hydroxy-2α-methyl-16-pregnen-3-one (II),
(11) 20α-hydroperoxy-3β,21-dihydroxy-16-pregnene (II),
(12) 20α-hydroperoxy-3α,21-dihydroxy-16-pregnene (II),
(13) 20α-hydroperoxy-3β,11β,21-trihydroxy-16-pregnene (II),
(14) 20α-hydroperoxy-2α-fluoro-11β,21-dihydroxy-1,4,16-pregnatriene-3-one (II).
(15) 20α-hydroperoxy-2α-methyl-11β,21-dihydroxy-1,4,16-pregnatrien-3-one (II),
(16) 20α-hydroperoxy-2α,4α-difluoro-11β,21-dihydroxy-1,4,16-pregnatrien-3-one (II),
(17) 20α-hydroperoxy-4α-methyl-11β,21-dihydroxy-1,4,16-pregnatrien-3-one (II),
(18) 20α-hydroperoxy-6α-fluoro-11β,21-dihydroxy-4,16-pregnadien-3-one (II),
(19) 20α-hydroperoxy-6α-methyl-11β,21-dihydroxy-1,4,16-pregnatrien-3-one (II),
(20) 20α-hydroperoxy-7α-methyl-11β,21-dihydroxy-4,16-pregnadien-3-one (II),
(21) 20α-hydroperoxy-7α-fluoro-11β,21-dihydroxy-1,4,16-pregnatrien-3-one (II),
(22) 20α-hydroperoxy-9α-fluoro-11β,21-dihydroxy-4,16-pregnadien-3-one (II),
(23) 20α-hydroperoxy-9α-fluoro-21-hydroxy-1,4,16-pregnatriene-3,11-dione (II),
(24) 20α-hydroperoxy-6α,9α-difluoro-11β,21-dihydroxy-1,4,16-pregnatrien-3-one (II),
(25) 20α-hydroperoxy-6α,9α-difluoro-21-hydroxy, 4,16-pregnadien-3,11-dione (II),
(26) 20α-hydroperoxy-6-chloro-11β,21-dihydroxy-9α-fluoro-4,6,16-pregnatrien-3-one (II),
(27) 20α-hydroperoxy-6α,9α-difluoro-11β,21-dihydroxy-1,4,6,16-pregnatetraen-3-one (II),
(28) 20α-hydroperoxy-9α-fluoro-21-hydroxy-6α-methyl-1,4,16-pregnatriene-3,11-dione (II),
(29) 20α-hydroperoxy-6α,9α-difluoro-11β,21-dihydroxy-2α,6α-dimethyl-4,16-pregnadien-3-one (II),
(30) 20α-hydroperoxy-6α-fluoro-2α-methyl-11β,21-dihydroxy-1,4,16-pregnatrien-3-one (II),
(31) 20α-hydroperoxy-2α,6α-methyl-11β,21-dihydroxy-4,16-pregnadien-3-one (II),
(32) 20α-hydroperoxy-2α,6α-dimethyl-9α-fluoro-11β,21-dihydroxy-1,4,16-pregnatrien-3-one (II),
(33) 20α-hydroperoxy-3-(2,2-dimethylpropylenedioxy)-6β-methyl-5α,11β,21-trihydroxy-16-pregnene (II),
(34) 20α-hydroperoxy-3β,11β,21-trihydroxy-16-pregnene 3-acetate (II),
(35) 20α-hydroperoxy-3β,21-dihydroxy-16-pregnen 3-acetate (II),
(36) 20α-hydroperoxy-3α,21-dihydroxy-16-pregnen 3-acetate (II),
(37) 20α-hydroperoxy-2α,9α-difluoro-11β,21-dihydroxy-6α-methyl-1,4,16-pregnatrien-3-one (II),
(38) 20α-hydroperoxy-21-hydroxy-2α,6α-difluoro-4α,9α-dimethyl-4,16-pregnadiene-3,11-dione (II),
(39) 20α-hydroperoxy-11β,21-dihydroxy-5,16-pregnadien-3-one 3-ethylene ketal (II),
(40) 20α-hydroperoxy-21-hydroxy-4,9(11),16-pregnatrien-3-one (II),
(41) 20α-hydroperoxy-6α-fluoro-11β,21-dihydroxy-9α-methyl-4,16-pregnadien-3-one (II),
(42) 20α-hydroperoxy-6-chloro-11β,21-dihydroxy-9α-methyl-1,4,6,16-pregnatetraen-3-one 21-acetate (II),
(43) 20α-hydroperoxy-11β,21-dihydroxy-6α,9α-dimethyl-1,4,16-pregnatrien-3-one 21-acetate (II),
(44) 20α-hydroperoxy-6α,9α-dichloro-21-hydroxy-1,4,16-pregnatriene-3,11-dione 21-acetate (II),
(45) 20α-hydroperoxy-6α-chloro-21-hydroxy-4,9(11),16-pregnatrien-3-one (II),
(46) 20α-hydroperoxy-11β,21-dihydroxy-2α,6α,9α-trifluoro-4,16-pregnadien-3-one (II),
(47) 20α-hydroperoxy-11β,21-dihydroxy-2,4,6α-trimethyl-1,4,16-pregnatrien-3-one 21-acetate (II),
(48) 20α-hydroperoxy-11β,21-dihydroxy-2α,4,6α,9α-tetrafluoro-4,16-pregnadien-3-one (II),
(49) 20α-hydroperoxy-11β,21-dihydroxy-2,9α-difluoro-4,6α-dimethyl-1,4,16-pregnatrien-3-one (II) and
(50) 20α-hydroperoxy-21-hydroxy-6α,9α-difluoro-2α,4-dimethyl-4,6,16-pregnatriene-3,11-dione (II).

yields, respectively, (1) 11β,21-dihydroxy-4,6,16-pregnatriene-3,20-dione 21-acetate (III),
(2) 11β,21-dihydroxy-4,16-pregnadiene-3,20-dione 21-acetate (III),
(3) 21-hydroxy-1,4,16-pregnatriene-3,11,20-trione 21-acetate (III),
(4) 21-hydroxy-4,16-pregnadiene-3,11,20-trione 21-acetate (III),
(5) 21-hydroxy-4,6,16-pregnatriene-3,11,20-trione 21-acetate (III),
(6) 11α,21-dihydroxy-1,4,16-pregnatriene-3,20-dione 21-acetate (III),
(7) 21-hydroxy-4,16-pregnadiene-3,20-dione 21-acetate (III),
(8) 21-hydroxy-1,4,16-pregnatriene-3,20-dione 21-acetate (III),
(9) 11β,21-dihydroxy-1,4,6,16-pregnatetraene-3,20-dione 21-acetate (III),
(10) 21-hydroxy-2α-methyl-16-pregnene-3,20-dione 21-acetate (III),
(11) 3β,21-dihydroxy-16-pregnene-20-one 3,21-diacetate (III),
(12) 3α,21-dihydroxy-16-pregnen-20-one 3,21-diacetate (III),
(13) 3β,11β,21-trihydroxy-16-pregnen-20-one 3,21-diacetate (III),
(14) 11β,21-dihydroxy-2α-fluoro-1,4,16-pregnatriene-3,20-dione 21-acetate (III),
(15) 11β,21-dihydroxy-2α-methyl-1,4,16-pregnatriene-3,20-dione 21-acetate (III),
(16) 11β,21-dihydroxy-2α,4α-difluoro-1,4,16-pregnatriene-3,20-dione 21-acetate (III),
(17) 11β,21-dihydroxy-4α-methyl-1,4,16-pregnatriene-3,20-dione 21-acetate (III),
(18) 11β,21-dihydroxy-6α-fluoro-4,16-pregnadiene-3,20-dione 21-acetate (III),
(19) 11β,21-dihydroxy-6α-methyl-1,4,16-pregnatriene-3,20-dione 21-acetate (III),
(20) 11β,21-dihydroxy-7α-methyl-4,16-pregnatriene-3,20-dione 21-acetate (III),
(21) 11β,21-dihydroxy-7α-fluoro-1,4,16-pregnatriene-3,20-dione 21-acetate (III),
(22) 11β,21-dihydroxy-9α-fluoro-4,16-pregnadiene-3,20-dione 21-acetate (III),
(23) 21-hydroxy-9α-fluoro-1,4,16-pregnatriene-3,11,20-trione 21-acetate (III),
(24) 11β,21-dihydroxy-6α,9α-difluoro-1,4,16-pregnatriene-3,20-dione 21-acetate (III),
(25) 21-hydroxy-6α,9α-difluoro-4,16-pregnadiene-3,11,20-trione 21-acetate (III),
(26) 11β,21-dihydroxy-6-chloro-9α-fluoro-4,6,16-pregnatriene-3,20-dione 21-acetate (III),
(27) 11β,21-dihydroxy-6α,9α-difluoro-1,4,6,16-pregnatetraene-3,20-dione 21-acetate (III),
(28) 21-hydroxy-9α-fluoro-6α-methyl-1,4,16-pregnatriene-3,11,20-trione 21-acetate (III),
(29) 11β,21-dihydroxy-6α,9α-difluoro-2α,6α-dimethyl-4,16-pregnadiene-3,20-dione 21-acetate (III),
(30) 11β,21-dihydroxy-6α-fluoro-2α-methyl-1,4,16-pregnatriene-3,20-dione 21-acetate (III),
(31) 11β,21-dihydroxy-2α,6α-dimethyl-4,16-pregnadiene-3,20-dione 21-acetate (III),

17

(32) 11β,21-dihydroxy-2α,6α-dimethyl-9α-fluoro-1,4,16-pregnatriene-3,20-dione 21-acetate (III),
(33) 5α,11β,21-trihydroxy-3-(2,2-dimethylpropylenedioxy)-6β-methyl-16-pregnen-20-one 21-acetate (III),
(34) 3β,11β,21-trihydroxy-16-pregnen-20-one 3,21-diacetate (III),
(35) 3β,21-dihydroxy-16-pregnen-20-one 3,21-diacetate (III),
(36) 3α,21-dihydroxy-16-pregnen-20-one 3,21-diacetate (III),
(37) 11β,21-dihydroxy-2α,9α-difluoro-6α-methyl-1,4,16-pregnatriene-3,20-dione 21-acetate (III),
(38) 21-hydroxy-2α,6α-difluoro-4α,9α-dimethyl-4,16-pregnadiene-3,11,20-trione 21-acetate (III),
(39) 11β,21-dihydroxy-5,16-pregnadiene-3,20-dione 3-ethylene ketal 21-acetate (III),
(40) 21-hydroxy-4,9(11),16-pregnatriene-3,20-dione 21-acetate (III),
(41) 11β,21-dihydroxy-6α-fluoro-2α-methyl-4,16-pregnadiene-3,20-dione 21-acetate (III),
(42) 11β,21-hydroxy-6-chloro-9α-methyl-1,4,6,16-pregnatetraene-3,20-dione 21-acetate (III),
(43) 11β,21-dihydroxy-6α,9α-dimethyl-1,4,16-pregnatriene-3,20-dione 21 acetate (III),
(44) 21-hydroxy-6α,9α-dichloro-1,4,16-pregnatriene-3,11,20-trione 21-acetate (III),
(45) 21-hydroxy-6α-chloro-4,9(11),16-pregnatriene-3,20-dione 21-acetate (III),
(46) 11β,21-dihydroxy-2α,6α,9α-trifluoro-4,16-pregnadiene-3,20-dione 21 acetate (III),
(47) 11β,21-dihydroxy-2,4,6α-trimethyl-1,4,16-pregnatriene-3,20-dione 21-acetate (III),
(48) 11β,21-dihydroxy-2α,4,6α,9α-tetrafluoro-4,16-pregnadiene-3,20-dione 21 acetate (III),
(49) 11β,21-dihydroxy-2,9α-difluoro-4,6α-dimethyl-1,4,16-pregnatriene-3,20-dione 21 acetate (III) and
(50) 21-hydroxy-6α,9α-difluoro-2α,4-dimethyl-4,6,16-pregnatrien-3,11,20-trione 21-acetate (II), Following the procedure of Example 4, but substituting the corresponding 20β-hydroperoxides (II) for the 20α-hydroperoxy starting materials (II) in (1) to (50), above, also yields the 20-keto-products of Formula III in (1) to (50), above.

Following the procedure of Example 4, but substituting the corresponding 21-desoxy compounds (II) for the 21-hydroxy and 21-acyloxy starting materials (II) in (1) to (50), above, yields the corresponding 21-desoxy-20-keto-products of Formula III in (1) to (50), above.

While the products (III) prepared in (1) through (50) of Example 4, above, are 3,21-diacetates and 21-acetates, other 3,21-diacylates and 21-acylates of these compounds can be prepared in a similar manner, e.g., by substituting for acetic anhydride another anhydride wherein the acyl radical contains one or from three to twelve carbon atoms, inclusive.

*Example 5.—11β,21-dihydroxy-1,4,16-pregnatriene-3,20-dione 21-acetate (III) without isolation of the intermediate hydroperoxide (II)*

A solution of 2 g. of 11β,21-dihydroxy-1,4,17(20)-cis-pregnatrien-3-one (I) and 40 mg. of hematoporphyrin in 125 ml. of pyridine was irradiated with a fluorescent lamp while oxygen was bubbled therethrough. After a period of about 6 to 7 hours, thin layer chromatography showed that no starting steroid remained, being replaced by a major product having nearly the same mobility. To the pyridine solution of the irradiation products 20 ml. of acetic anhydride was added and the mixture allowed to stand at room temperature for a period of about 16 hours. About 500 ml. of water was added and the mixture refrigerated for a period of about 16 hours. Filtration of the mixture gave 1.36 g. of brown crystalline material. The filtrate was extracted with ethyl acetate and the extract washed with water, then dilute hydrochloric acid, dried and the solvent evaporated to give about 400 mg. of a brown gum.

18

This solid was dissolved in 200 ml. of methylene chloride and passed through a column of 10 g. of Florisil. Evaporation of the eluates gave 1.256 g. of solid fractions which were recrystallized from a mixture of acetone and Skellysolve B, to provide 1.012 g. of 11β,21-dihydroxy-1,4,16-pregnatriene-3,20-dione 21-acetate (III) with a melting point of 195 to 204° C.

The extraction residue dissolved in 100 ml. of methylene chloride was also passed through the same 10 g. of Florisil to give 353 mg. of crystalline material which was recrystallized from acetone-Skellysolve B to yield 191 mg. of product (III) melting at 190 to 204° C. The combined yield of recrystallized material (III) was 1.203 g. (51.5% of theoretical). These combined crops on recrystallization from acetone-Skellysolve B gave 1.044 g. (45% of theoretical) of colorless product (III) melting at 200 to 205° C.; it showed one spot on a thin-layer chromatogram, and had an infrared absorption spectrum identical to authentic samples of 11β,21-dihydroxy-1,4,16-pregnatriene-3,20-dione 21-acetate (III).

*Example 6.—5α,11β,21-trihydroxy-3-(2,2-dimethylpropylenedioxy)-6β-methyl-15-pregnen-21-acetate (III)*

A solution of 10 g. of 3-(2,2-dimethylpropylenedioxy)-6β-methyl-17(20)-cis-pregnene-5α,11β,21-triol 21-acetate (I) and 0.2 g. of hematoporphyrin in 100 ml. of pyridine in a Pyrex (Corning Glass Works) tube 47 x 2.2 cm. was irradiated with an external 15 watt fluorescent lamp for a period of about 24 hours while a slow stream of oxygen was bubbled therethrough. A 75 ml. aliquot was mixed with 20 ml. of acetic anhydride and allowed to stand at about 30° C. for about 2.5 hours, and for about 16 hours at about 5° C. The solution was then poured slowly into 900 ml. of ice water to give a gummy precipitate which was collected, dissolved in methylene chloride, washed with sodium chloride solution, dried over magnesium sulfate and evaporated to give 7.3 g. of a tan form. A 5 g. sample of the crude product (III) dissolved in methylene chloride was purified on a short 100 g. column of Florisil. The acetone-Skellysolve B eluate contained 4.6 g. of solids and was crystallized from acetone-Skellysolve B containing a small amount of triethylamine to give 3.6 g. of crystals (III) melting at 211 to 224° C. Recrystallization gave an analytical sample of 5α,11β,21-trihydroxy-3-(2,2-dimethylpropylenedioxy)-6β-methyl-16-pregnen-20-one 21-acetate (III) with a melting point of 222 to 228° C., rotation $[α]_D$ +18° (c. 0.65 chloroform) and λ max. 241 mμ (ε 8150).

*Anal.*—Calcd. for $C_{29}H_{44}O_7$: C, 69.02; H, 8.79. Found: C, 68.71; H, 8.83.

*Example 7.—11β,21-dihydroxy-1,4,16-pregnatriene-3,20-dione 21-acetate (III)*

A solution of 10 g. of 11β,21-dihydroxy-1,4,17(20)-pregnatrien-3-one (I) and 0.5 g. of methylene blue in 75 ml. of dimethylformamide in a Pyrex tube was irradiated with four 15 watt fluorescent lamps for a period of about 24 hours while oxygen was slowly bubbled therethrough. The solution containing the intermediate produced by this photosensitized oxygenation, namely, 20α-hydroperoxy-11β,21-dihydroxy-1,4,16-pregnatrien-3-one (II) was cooled and 15 ml. of pyridine and 28 ml. of acetic anhydride added; the resulting solution was allowed to stand for a period of about 22 hours at a temperature of about 5° C. The solution was diluted with water to a volume of about 2 liters to give, after filtration and drying, 8.2 g. of crude 20-ketone (III) as a green-blue powder. Crystallization of this material from acetone-Skellysolve B (employing decolorizing charcoal) gave 4.43 g. of pure 11β,21-dihydroxy-1,4-16-pregnatriene-3,20-dione 21-acetate (III), melting at 196 to 205° C.

*Example 8.—3-(2,2-dimethylpropylenedioxy)-6β-methyl-5α,11β,21-trihydroxy-16-pregnen-20-one 21-acetate (III)*

To a solution of 5 g. of 3-(2,2-dimethylpropylenedioxy)-6β-methyl-5α,11β,21-trihydroxy-17(20)-pregnene (I)

in 200 ml. of methylene chloride, 0.2 g. of hematoporphyrin in 6 ml. of pyridine was added. The mixture was irradiated with a circular 15 watt fluorescent lamp while air was bubbled therethrough for a period of about 45 hours. The reaction mixture was washed successively with ice water, dilute hydrochloric acid, water and sodium bicarbonate solution, then dried over magnesium sulfate and the liquid evaporated to give 5.8 g. of crude 20α-hydroperoxy - 3 - (2,2 - dimethylpropylenedioxy) - 6β - methyl-5α,11β,21-trihydroxy-16-pregnen (II) as a dark gel. A 1 g. portion of this material (II) dissolved in 2 ml. of pyridine and 4 ml. of acetic anhydride was allowed to stand for about 16 hours at about 25° C. Addition of about 250 ml. of water gave a precipitate of crude product (III) that was purified by chromatography on a 100 g. column of Florisil. Elution with acetone-Skellysolve B gave a peak fraction yielding 0.506 g. of pure 3-(2,2-dimethylpropylenedioxy)-6β-methyl-5α,11β,21 - trihydroxy-16-pregnen-20-one 21-acetate (III).

*Example 9.—3-(2,2-dimethylpropylenedioxy)-6β-methyl-5α,11β,21-trihydroxy-16-pregnen-20-one 21-acetate (III)*

To a solution of 20 g. of 3-(2,2-dimethylpropylenedioxy)-6β-methyl-5α,11β,21-trihydroxy-17(20) - pregnene (I) in 85 ml. of dimethylformamide (freshly distilled from sodium hydride) in a tube 3.5 cm. in diameter and 400 cm. long, 40 mg. of hematoporphyrin was added and oxygen bubbled slowly through the mixture by means of a sparger. The reaction mixture was illuminated with four 15 watt fluorescent lamps, each 400 cm. long, and the reaction allowed to proceed for a period of about 26 hours. The reaction mixture was diluted with 50 ml. of pyridine and acetylated by warming with 25 ml. of acetic anhydride or a steam bath for about 30 minutes and allowing the capped mixture to stand for about 3 hours at room temperature. The mixture was poured into 3 liters of ice and water and after about 30 minutes, the crude product (III) was filtered by suction. The wet filter cake was dissolved in 400 ml. of methylene chloride, the water layer separated and the organic phase dried over anhydrous sodium sulfate. The methylene chloride solution was chromatographed over a 750 g. column of Florisil. The column was eluted with 400 ml. portions of 10% acetone in Skellysolve B. Crystalline material was recovered from fractions 12 to 20, inclusive, which was combined and triturated with a 1/1 mixture of boiling ether and Skellysolve B to give 6.83 g. of product (III) as a first crop with a melting point of 238 to 240° C. The mother liquors were concentrated to give a second crop of 4.0 g. of 3-(2,2-dimethylpropylenedioxy)-6β-methyl-5α,11β,21-trihydroxy-16-pregnen-20 - one 21-acetate (III), melting at 235 to 236° C. The infrared spectra of the two crops were identical.

*Example 10*

In this example certain of the new compounds of this invention are prepared by a novel process therefor, which is illustratively represented by the following reaction sequence:

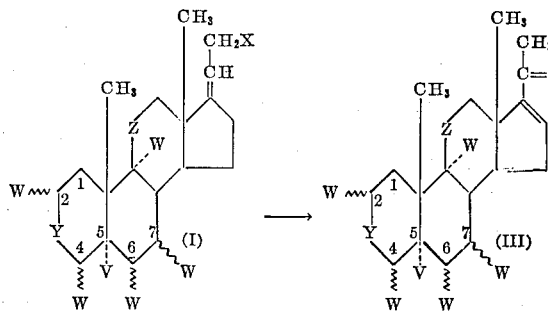

wherein 1(2), 4(5), 6(7), ∿, V, W, X, Y and Z have the same meanings as those given therefor following the flow-sheet in column 1.

Following the procedure of Examples 5 to 9, inclusive, but substituting for the starting materials (I) employed therein the following representative starting materials:

(1) 11β,21-dihydroxy-4,17(20)-pregnadien-3-one 21-acetate (I),
(2) 21-hydroxy-4,17(20)-pregnadien-3,11-dione (I),
(3) 11α,21-dihydroxy-4,17(20)-pregnadien-3-one (I),
(4) 21-hydroxy-4,6,17(20)-pregnatrien-3-one (I),
(5) 11β,21-dihydroxy-17(20)-pregnen-3-one (I),
(6) 3β,21-dihydroxy-17(20)-pregnene (I),
(7) 4-chloro-11β,21-dihydroxy-4,17(20)-pregnadien-3-one 21-acetate (I),
(8) 2α-fluoro-11β,21-dihydroxy-4,17(20)-pregnadien-3-one (I),
(9) 2α-methyl-11β,21-dihydroxy-4,6,17(20)-pregnatrien-3-one (I),
(10) 21-hydroxy-2-methyl-1,4,17(20)-pregnatrien-3-one (I),
(11) 6α-fluoro-11β,21-dihydroxy-1,4,17(20)-pregnatrien-3-one (I),
(12) 21-hydroxy-6α-methyl-4,17(20)-pregnadien-3-one (I),
(13) 7α-methyl-11β,21-dihydroxy-1,4,17(20)-pregnatrien-3-one (I),
(14) 21-hydroxy-7α-fluoro-4,17(20)-pregnadien-3-one (I),
(15) 9α-fluoro-11β,21-dihydroxy-1,4,6,17(20)-pregnatetraen-3-one 21-acetate (I),
(16) 6α-chloro-9α-fluoro-11β,21-dihydroxy-4,17(20)-pregnadien-3-one (I),
(17) 9α-fluoro-21-hydroxy-6α-methyl-4,17(20)-pregnadien-3,11-dione (I),
(18) 6α,9α-difluoro-11β,21-dihydroxy-2,4-dimethyl-1,4,17(20)-pregnatriene-3-one (I),
(19) 2α,6α-dimethyl-9α-fluoro-21-hydroxy-4,17(20)-pregnadien-3,11-dione (I),
(20) 3β,21-dihydroxy-17(20)-pregnene-3-acetate (I),
(21) 3β,11β,21-trihydroxy-17(20)-pregnene-3,21-diacetate (I),
(22) 6-chloro-11β,21-dihydroxy-9α-methyl-4,6,17(20)-pregnatrien-3-one 21-acetate (I),
(23) 6α,9α-difluoro-2,7α-dimethyl-11β,21-dihydroxy-1,4,17(20)-pregnatrien-3-one (I),
(24) 6α,9α-dichloro-21-hydroxy-4,17(20)-pregnadien-3,11-dione 21-acetate (I),
(25) 2,9α-difluoro-11β,21-dihydroxy-1,4,17(20)-pregnatrien-3-one (I),
(26) 11β-hydroxy-4,17(20)-pregnadien-3-one (I),
(27) 11α-hydroxy-1,4,17(20)-pregnatrien-3-one (I),
(28) 11β-hydroxy-17(20)-pregnene-3-one (I),
(29) 3α,11β-dihydroxy-17(20)-pregnene (I),
(30) 2-fluoro-11β-hydroxy-1,4,17(20)-pregnatrien-3-one (I),
(31) 2α-methyl-11β-hydroxy-4,17(20)-pregnadien-3-one (I),
(32) 4-fluoro-11β-hydroxy-4,17(20)-pregnadien-3-one (I),
(33) 4-methyl-11β-hydroxy-1,4,17(20)-pregnatrien-3-one (I),
(34) 6α-fluoro-1,4,17(20)-pregnatriene-3,11-dione (I),
(35) 6α-methyl-11β-hydroxy-1,4,17(20)-pregnatrien-3-one (I),
(36) 7α-fluoro-11β-hydroxy-4,6,17(20)-pregnatrien-3-one (I),
(37) 7α-methyl-11β-hydroxy-4,17(20)-pregnadien-3-one (I),
(38) 9α-fluoro-11β-hydroxy-4,17(20)-pregnadien-3-one (I),
(39) 6α,9α-difluoro-11β-hydroxy-1,4,17(20)-pregnatrien-3-one (I),
(40) 6-chloro-9α-fluoro-11β-hydroxy-4,6,17(20)-pregnatrien-3-one (I),
(41) 6α,9α-difluoro-2α-methyl-11β-hydroxy-4,17(20)-pregnadien-3-one (I),

(42) 4,9α-difluoro-6α-methyl-1,4,17(20)-pregnatrien-3,11-dione (I)
(43) 2,6α-dimethyl-9α-fluoro-11β-hydroxy-1,4,17(20)-pregnatrien-3-one (I),
(44) 3α-hydroxy-1,4,17(20)-pregnatrien-3-acetate (I),
(45) 11β-hydroxy-5,17(20)-pregnadien-3-one 3-ethylene ketal (I),
(46) 11α-hydroxy-4,17(20)-pregnadien-3-one (I),
(47) 6α-methyl-1,4,9(11),17(20)-pregnatetraen-3-one (I),
(48) 2,4,6α-trimethyl-1,4,17(20)-pregnatrien-3-one (I),
(49) 11β-hydroxy-2α,4,6α,9α-tetrafluoro-4,17(20)-pregnadien-3-one (I) and
(50) 4,9α-difluoro-2,6α-dimethyl-11β-hydroxy-1,4,17(20)-pregnatrien-3-one (I).

yields, respectively, (1) 11β,21-dihydroxy-4,16-pregnadiene-3,20-dione 21-acetate (III),
(2) 21-hydroxy-4,16-pregnadiene-3,11,20-trione (III),
(3) 11α,21-dihydroxy-4,16-pregnadiene-3,20-dione (III),
(4) 21-hydroxy-4,6,16-pregnatriene-3,20-dione (III),
(5) 11β,21-dihydroxy-16-pregnene-3,20-dione (III),
(6) 3β,21-dihydroxy-16-pregnene (III),
(7) 4-chloro-11β,21-dihydroxy-4,16-pregnene-3,20-dione (III),
(8) 2α-fluoro-11β,21-dihydroxy-4,16-pregnadiene-3,20-dione (III),
(9) 2α-methyl-11β,21-dihydroxy-4,6,16-pregnatriene-3,20-dione (III),
(10) 21-hydroxy-2-methyl-1,4,16-pregnatriene-3,20-dione (III),
(11) 6α-fluoro-11β,21-dihydroxy-1,4,16-pregnatriene-3,20-dione (III),
(12) 21-hydroxy-6α-methyl-4,16-pregnadiene-3,20-dione (III),
(13) 7α-methyl-11β,21-dihydroxy-1,4,16-pregnatriene-3,20-dione (III),
(14) 21-hydroxy-7α-fluoro-4,16-pregnadiene-3,20-dione (III),
(15) 9α-fluoro-11β,21-dihydroxy-1,4,6,16-pregnatetraene-3,20-dione (III),
(16) 6α-chloro-9α-fluoro-11β,21-dihydroxy-4,16-pregnadiene-3,20-dione (III),
(17) 9α-fluoro-21-hydroxy-6α-methyl-4,16-pregnadiene-3,20-dione (III),
(18) 6α,9α-difluoro-11β,21-dihydroxy-2,4-dimethyl-1,4,16-pregnatriene-3,20-dione (III),
(19) 2α,6α-dimethyl-9α-fluoro-21-hydroxy-4,16-pregnadiene-3,11,20-trione (III),
(20) 3β,21-dihydroxy-16-pregnen-20-one 3-acetate (III),
(21) 3β,11β,21-trihydroxy-16-pregnen-20-one 3,21-diacetate (III),
(22) 6-chloro-11β,21-dihydroxy-9α-methyl-4,6,16-pregnatriene-3,20-dione 21-acetate (III),
(23) 6α,9α-difluoro-2,7α-dimethyl-11β,21-dihydroxy-1,4,16-pregnatriene-3,20-dione (III),
(24) 6α,9α-dichloro-21-hydroxy-4,16-pregnadiene-3,11,20-trione 21-acetate (III),
(25) 2,9α-difluoro-11β,21-dihydroxy-1,4,16-pregnatriene-3,20-dione (III),
(26) 11β-hydroxy-4,16-pregnadiene-3,20-dione (III),
(27) 11α-hydroxy-1,4,16-pregnatriene-3,20-dione (III),
(28) 11β-hydroxy-16-pregnene-3,20-dione (III),
(29) 3α,11β-dihydroxy-16-pregnene-3,20-dione (III),
(30) 2-fluoro-11β-hydroxy-1,4,16-pregnatriene-3,20-dione (III),
(31) 2α-methyl-11β-hydroxy-4,16-pregnadiene-3,20-dione (III),
(32) 4-fluoro-11β-hydroxy-4,16-pregnadiene-3,20-dione (III),
(33) 4-methyl-11β-hydroxy-1,4,16-pregnatriene-3,20-dione (III),
(34) 6α-fluoro-1,4,16-pregnatriene-3,11,20-trione (III),
(35) 6α-methyl-11β-hydroxy-4,6,16-pregnatriene-3,20-dione (III),
(36) 7α-fluoro-11β-hydroxy-4,6,16-pregnatriene-3,20-dione (III),
(37) 7α-methyl-11β-hydroxy-4,16-pregnadiene-3,20-dione (III),
(38) 9α-fluoro-11β-hydroxy-4,16-pregnadiene-3,20-dione (III),
(39) 6α,9α-difluoro-11β-hydroxy-1,4,16-pregnatriene-3,20-dione (III),
(40) 6-chloro-9α-fluoro-11β-hydroxy-4,6,16-pregnatriene-3,20-dione (III),
(41) 6α,9α-difluoro-2α-methyl-11β-hydroxy-4,16-pregnadiene-3,20-dione (III),
(42) 4,9α-difluoro-6α-methyl-1,4,16-pregnatriene-3,11,20-trione (III),
(43) 2,6α-dimethyl-9α-fluoro-11β-hydroxy-1,4,16-pregnatriene-3,20-dione (III),
(44) 3α-hydroxy-1,4,16-pregnatrien-20-one 3-acetate (III),
(45) 11β-hydroxy-5,16-pregnadiene-3,20-dione 3-ethylene ketal (III),
(46) 11α-hydroxy-4,16-pregnadiene-3,20-dione (III),
(47) 6α-methyl-1,4,9(11),16-pregnatetraene-3,20-dione (III),
(48) 2,4,6α-trimethyl-1,4,16-pregnatriene-3,20-dione (III),
(49) 11β-hydroxy-2α,4,6α,9α-tetrafluoro-4,16-pregnadiene-3,20-dione (III) and
(50) 4,9α-difluoro-2,6α-dimethyl-11β-hydroxy-1,4,16-pregnatriene-3,20-dione.

The Δ$^{16}$-20-ketones (II) of (1) to (50), above, can be prepared from either the cis or trans form of the corresponding Δ$^{17(20)}$-steroidal olefins (I) of (1) to (50).

*Example 11.*—*20α-hydroperoxy-3-(2,2 - dimethylpropylenedioxy)-6β-methyl - 5α,11β - dihydroxy-16-pregnene (II) 3-(2,2-dimethylpropylenedioxy) - 6β - methyl-5α, 11β-dihydroxy-16-pregnen-20-one (III)*

To 50 ml. of anhydrous ammonia 1 g. of sodium was added in portions. The mixture was stirred until the sodium had dissolved and then a solution of 4.8 g. of 3-(2,2 - dimethylpropylenedioxy)-6β-methyl-5α,11β,21 - trihydroxy-17(20)-cis-pregnene-21-acetate (I) in 50 ml. of ether containing 1 ml. of absolute ethanol was added dropwise. An additional 5 ml. of ether and 1 ml. of ethanol was used to rinse the container. After a period of about 30 minutes, water was slowly added to the reaction mixture, the mixture poured into a separatory funnel and the layers separated, more ether being employed in the transfer. The ether layer was washed with water, dried and evaporated to give a solid residue. This was dissolved in methylene chloride and chromatographed on a column of 400 g. of Florisil. A total of 2.21 g. of crystalline product (I) was eluted with a mixture of 2.5% acetone in Skellysolve B. This was recrystallized from methanol to give 1.754 g. of 3-(2,2-dimethylpropylenedioxy)-6β-methyl-5α,11β-dihydroxy-17(20)-pregnene (I) melting at 134 to 140° C., and after a further recrystallization at 138 to 140° C., with a rotation [α]$_D$ of −14° (chloroform), $\nu$=3480, 1677, 1097, 1030 and 1010 cm.$^{-1}$.

*Anal.*—Calcd. for $C_{27}H_{46}O_4$: C, 74.61; H, 10.67. Found: C, 74.38; H, 10.57.

A solution of 1 g. of 3-(2,2-dimethylpropylenedioxy)-6β-methyl-5α,11β-dihydroxy-17(20)-pregnene (I) in 125 ml. of pyridine containing 40 mg. of hematoporphyrin was irradiated with a 20 watt fluorescent lamp while oxygen was bubbled through the solution for a period of about 2.75 hours. Thin-layer chromatography of a sample removed after about one hour showed that most of the starting material was converted to a more polar product. The solution was poured into water, extracted with ethyl acetate, washed with water several times, dried and evaporated to give a non-crystalline residue. This material was chromatographed on a 100 g. column of Florisil and eluted with one liter each of a mixture of 2½%, 5%, 7½%, 10% and 20% acetone in Skellysolve B; 250 ml. fractions of the eluates were collected. A total of 100 mg. of crystalline 3-(2,2-dimethylpropylenedioxy)-6β-methyl-5α,11β-dihydroxy - 16 - pregnen - 20-one (III) was eluted with 7½% acetone-Skellysolve B; its infrared absorption spectrum was identical to that of an authentic sample. The principal product (II), an amorphous solid that did not crystallize satisfactorily, was eluted with 10 to 20% acetone-Skellysolve B and weighed 894 mg. This material, 20α - hydroperoxy - 3-(2,2 - dimethylpropylenedioxy) - 6β - methyl - 5α,11β-dihydroxy-16-pregnene (II), liberated iodine from potassium iodide and had infrared absorptions at 3500, 1100, 1040 and 1015 cm.$^{-1}$.

*Anal.*—Calcd. for $C_{27}H_{44}O_6$: C, 69.79; H, 9.55. Found: C, 70.16; H, 9.85.

Example 12

In this example certain of the new compounds of this invention are prepared by a novel process therefor, which is illustratively represented by the following reaction sequence:

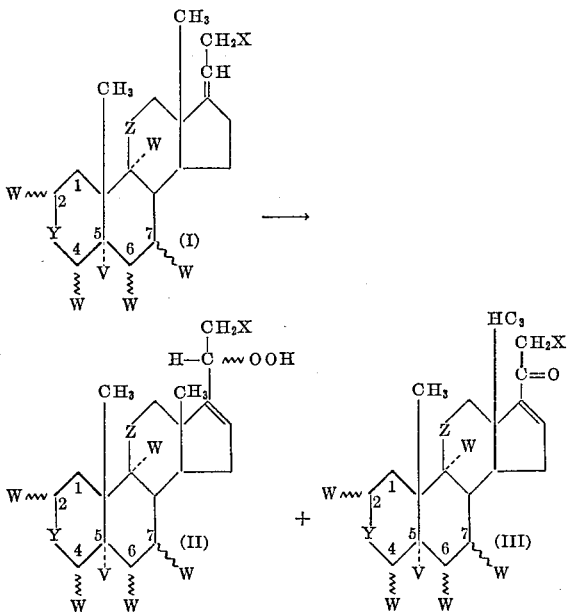

wherein 1(2), 4(5), 6(7), ⁓, V, W, X, Y and Z have the same meanings as those given therefor following the flow-sheet in column 1.

Following the procedure of Example 11 but substituting for 3 - (2,2 - dimethylpropylenedioxy) - 6β - methyl-5α,11β-dihydroxy-17(20)-pregnene (I) the following representative starting materials:

(1) 11β,21-dihydroxy-1,4,17(20)-pregnatrien-3-one 21-acetate (I),
(2) 11α,21-dihydroxy-4,17(20)-pregnadien-3-one (I),
(3) 21-hydroxy-1,4,17(20)-pregnatrien-3-one (I),
(4) 3α,21-dihydroxy-17(20)-pregnene (I),
(5) 21-hydroxy-2α-methyl-17(20)-pregnen-3-one (I),
(6) 2α-fluoro-11β,21-dihydroxy-4,17(20)-pregnadiene-3-one (I),
(7) 6α-fluoro-11β,21-dihydroxy-1,4,17(20)-pregnatrien-3-one (I),
(8) 6α-methyl-11β,21-dihydroxy-4,17(20)-pregnadien-3-one (I),
(9) 7α-fluoro-11β,21-dihydroxy-1,4,17(20)-pregnatrien-3-one (I),
(10) 21-hydroxy-7α-methyl-4,17(20)-pregnadiene-3,11-dione (I),
(11) 9α-fluoro-11β,21-dihydroxy-1,4,17(20)-pregnatrien-3-one (I),
(12) 6α,9α-difluoro-11β,21-dihydroxy-4,17(20)-pregnadien-3-one (I),
(13) 6-chloro-11β,21-dihydroxy-9α-fluoro-4,6,17(20)-pregnatrien-3-one (I),
(14) 6α,9α-difluoro-11β,21-dihydroxy-2,7-dimethyl-1,4,17(20)-pregnatrien-3-one (I),
(15) 3-(2,2-dimethylpropylenedioxy)-6β-methyl-5α,11β,21-trihydroxy-17(20)-pregnene (I),
(16) 11β,21-dihydroxy-5,17(20)-pregnadien-3-one 3-ethylene ketal (I),
(17) 3β,21-dihydroxy-17(20)-pregnen 3-acetate (I),
(18) 11β-hydroxy-1,4,17(20)-pregnatrien-3-one (I),
(19) 4,17(20)-pregnadien-3-one (I),
(20) 3β,11β-dihydroxy-4,17(20)-pregnadiene (I),
(21) 2-fluoro-11β-hydroxy-1,4,17(20)-pregnatrien-3-one (I),
(22) 2α-methyl-4,17(20)-pregnadien-3-one (I),
(23) 4-fluoro-11β-hydroxy-1,4,17(20)-pregnatrien-3-one (I),
(24) 4-methyl-4,6,17(20)-pregnatrien-3-one (I),
(25) 6α-fluoro-11β-hydroxy-4,17(20)-pregnadien-3-one (I),
(26) 6α-methyl-11β-hydroxy-1,4,17(20)-pregnatrien-3-one (I),
(27) 7α-methyl-11β-hydroxy-4,17(20)-pregnadien-3-one (I),
(28) 7α-fluoro-1,4,17(20)-pregnatriene-3,11-dione (I),
(29) 9α-fluoro-11β-hydroxy-4,17(20)-pregnadien-3-one (I),
(30) 6α,9α-difluoro-11β-hydroxy-1,4,17(20)-pregnatrien-3-one (I),
(31) 9α-fluoro-6-methyl-11β-hydroxy-1,4,6,17(20)-pregnatetraen-3-one (I),
(32) 2α,6α-difluoro-4,9α-dimethyl-4,17(20)-pregnadiene-3,11-dione (I),
(33) 11β-hydroxy-5,17(20)-pregnadien-3-one 3-ethylene ketal (I),
(34) 6α-chloro-4,9(11),17(20)-pregnatrien-3-one (I) and
(35) 4,6α-dimethyl-2,9α-difluoro-11β-hydroxy-1,4,17(20)-pregnatrien-3-one (I)

yields, respectively, (1) 20α-hydroperoxy-11β,21-dihydroxy-1,4,16-pregnatrien-3-one 21-acetate (II) and 11β,21-dihydroxy-1,4,16-pregnatriene-3,20-dione 21-acetate (III),
(2) 20α-hydroperoxy-11α-dihydroxy-4,16-pregnadien-3-one (II) and 11α,21-dihydroxy-4,16-pregnadien-3,20-dione (III),
(3) 20α-hydroperoxy-21-hydroxy-1,4,16-pregnatriene-3-one (II) and 21-hydroxy-1,4,16-pregnatriene-3,20-dione (III),
(4) 20α-hydroperoxy-3α,21-dihydroxy-16-pregnene (II) and 3α,21-dihydroxy-16-pregnene-20-one (III),
(5) 20α-hydroperoxy-21-hydroxy-2α-methyl-16-pregnen-3-one (II) and 21-hydroxy-2α-methyl-16-pregnene-3,20-dione (III),
(6) 20α-hydroperoxy-2α-fluoro-11β,21-dihydroxy-4,16-pregnadien-3-one (II) and 2α-fluoro-11β,21-dihydroxy-4,16-pregnadiene-3,20-dione (III),
(7) 20α-hydroperoxy-6α-fluoro-11β,21-dihydroxy-1,4,16-pregnatrien-3-one (II) and 6α-fluoro-11β,21-dihydroxy-1,4,16-pregnatriene-3,20-dione (III),
(8) 20α-hydroperoxy-6α-methyl-11β,21-dihydroxy-4,16-pregnadien-3-one (II) and 6α-methyl-11β,21-dihydroxy-4,16-pregnadiene-3,20-dione (III),
(9) 20α-hydroperoxy-7α-fluoro-11β,21-dihydroxy-1,4,16-pregnatrien-3-one (II) and 7α-fluoro-11β,21-dihydroxy-1,4,16-pregnatrien-3,20-dione (III),
(10) 20α-hydroperoxy-21-hydroxy-7α-methyl-4,16-pregnadien-3-one (II) and 21-hydroxy-7α-methyl-4,16-pregnadiene-3,20-dione (III),
(11) 20α-hydroperoxy-9α-fluoro-11β,21-dihydroxy-1,4,16-pregnatrien-3-one (II) and 9α-fluoro-11β,21-dihydroxy-1,4,16-pregnatriene-3,20-dione (III),

(12) 20α-hydroperoxy-6α,9α-difluoro-11β,21-dihydroxy-1,4,16-pregnatrien-3-one (II) and 6α,9α-difluoro-11β,21-dihydroxy-1,4,16-pregnatriene-3,20-dione (III),

(13) 20α-hydroperoxy-6-chloro-11β,21-dihydroxy-4,6,16-pregnatrien-3-one (II) and 6-chloro-11β,21-dihydroxy-4,6,16-pregnatriene-3,20-dione (III),

(14) 20α-hydroperoxy-6α,9α-difluoro-11β,21-dihydroxy-2,7-dimethyl-1,4,16-pregnatrien-3-one (II) and 6α,9α-difluoro-11β,21-dihydroxy-2,7-dimethyl-1,4,16-pregnatriene-3,20-dione (III),

(15) 20α-hydroperoxy-3-(2,2-dimethylpropylenedioxy)-6β-methyl-5α,11β,21-trihydroxy-16-pregnene (II) and 3-(2,2-dimethylpropylenedioxy)-6β-methyl-5α,11β,21-trihydroxy-16-pregnen-20-one (III),

(16) 20α-hydroperoxy-11β,21-dihydroxy-5,16-pregnadien-3-one 3-ethylene ketal (II) and 11β,21-dihydroxy-5,16-pregnadiene-3,20-dione 3-ethylene ketal (III),

(17) 20α-hydroperoxy,3β,21-dihydroxy-16-pregnen 3-acetate (II) and 3β,21-dihydroxy-16-pregnen-20-one 3-acetate (III),

(18) 20α-hydroperoxy-11β-hydroxy-1,4,16-pregnatrien-3-one (II) and 11β-hydroxy-1,4,16-pregnatriene-3-20-dione (III),

(19) 20α-hydroperoxy-4,16-pregnadien-3-one (I) and 4,16-pregnene-3,20-dione (III),

(20) 20α-hydroperoxy-3β,11β-dihydroxy-4,16-pregnadiene (II) and 3β,11β-dihydroxy-4,16-pregnadien-20-one (III),

(21) 20α-hydroperoxy-2-fluoro-11β-hydroxy-1,4,16-pregnatrien-3-one (I) and 2α-fluoro-11β-hydroxy-1,4,16-pregnatrien-3-one (I) and 2-fluoro-11β-hydroxy-1,4,16-pregnatrien-3,20-dione (III),

(22) 20α-hydroperoxy-2α-methyl-4,16-pregnadien-3-one (II) and 2α-methyl-4,16-pregnadiene-3,20-dione (III),

(23) 20α-hydroperoxy-4-fluoro-11β-hydroxy-1,4,16-pregnatrien-3-one (I) and 4-fluoro-11β-hydroxy-1,4,16-pregnatriene-3,20-dione (III),

(24) 20α-hydroperoxy-4-methyl-4,6,16-pregnatrien-3-one (II) and 4-methyl-4,6,16-pregnatriene-3,20-dione (III),

(25) 20α-hydroperoxy-6α-fluoro-11β-hydroxy-4,16-pregnadien-3-one (II) and 6α-fluoro-11β-hydroxy-4,16-pregnadiene-3,20-dione (III),

(26) 20α-hydroperoxy-6α-methyl-11β-hydroxy-1,4,16-pregnatrien-3-one (II) and 6α-methyl-11β-hydroxy-1,4,16-pregnatrien-3,20-dione (III),

(27) 20α-hydroperoxy-7α-methyl-11β-hydroxy-4,16-pregnadien-3-one (II) and 7α-methyl-11β-hydroxy-4,16-pregnadiene-3,20-dione (III),

(28) 20α-hydroperoxy-7α-fluoro-1,4,16-pregnatriene-3,11-dione (II) and 7α-fluoro-1,4,16-pregnatriene-3,11,20-trione (III),

(29) 20α-hydroperoxy-9α-fluoro-11β-hydroxy-4,16-pregnadien-3-one (II) and 9α-fluoro-11β-hydroxy-4,16-pregnadiene-3,20-dione (III),

(30) 20α-hydroperoxy-6α,9α-difluoro-11β-hydroxy-1,4,16-pregnatrien-3-one (II) and 6α,9α-difluoro-11β-hydroxy-1,4,16-pregnatriene-3,20-dione (III),

(31) 20α-hydroperoxy-9α-fluoro-6-methyl-11β-hydroxy-1,4,6,16-pregnatetraen-3-one (II) and 9α-fluoro-6-methyl-11β-hydroxy-1,4,6,16-pregnatetraene-3,20-dione (III),

(32) 20α-hydroperoxy-2α,6α-difluoro-4,9α-dimethyl-4,16-pregnadiene-3,11-dione (II) and 2α,6α-difluoro-4,9α-dimethyl-4,16-pregnadiene-3,11,20-trione (III),

(33) 20α-hydroperoxy-11β-hydroxy-5,16-pregnadien-3-one 3-ethylene ketal (II) and 11β-hydroxy-5,16-pregadiene-3,20-dione 3-ethylene ketal (III),

(34) 20α-hydroperoxy-6α-chloro-4,9(11),16-pregnatrien-3-one (II) and 6α-chloro-4,9(11),16-pregnatriene-3,20-dione (III) and

(35) 20α-hydroperoxy-4,6α-dimethyl-2,9α-difluoro-11β-hydroxyl-1,4,16-pregnatrien-3-one (II) and 4,6α-dimethyl-2,9α-difluoro-11β-hydroxy-1,4,16-pregnatriene-3,20-dione (III).

The 20 (α and β)-hydroperoxides (II) can be prepared from both the cis and trans forms of the Δ$^{17(20)}$-starting materials of Formula I in the manner described in Example 11.

*Example 13.—3-(2,2-dimethylpropylenedioxy)-6β-methyl-5α,11β,20α-trihydroxy-16-pregnene (IV)*

2.35 g. of 20α-hydroperoxy-3-(2,2-dimethylpropylenedioxy)-6β-methyl-5α,11β-dihydroxy-16-pregnene (II) in 125 ml. of pyridine was shaken for a period of about 5 hours with about 25 g. of Raney nickel (in water). The reaction mixture was filtered through Celite (diatomaceous earth), poured into water, extracted with ethyl acetate, washed with water, then with dilute hydrochloric acid solution, dried and the solvent evaporated. The residue was chromatographed on a 200 g. column of Florisil. A mixture of 20% acetone in Skellysolve B eluted 1.35 g. of crystalline fractions which were combined, recrystallized from ethyl acetate-Skellysolve B, to give 741 mg. of 3 - (2,2 - dimethylpropylenedioxy) - 6β-methyl-5α,11β,20α-trihydroxy-16-pregnene (IV), having a melting point of 198 to 200° C. and rotation [α]$_D$ of −11° (in chloroform).

*Anal.*—Calcd. for $C_{27}H_{44}O_5$: C, 72.28; H, 9.89. Found: C, 72.03; H, 9.83.

Following the procedure of Example 13, but substituting for the starting material (II) disclosed therein the corresponding 20β-hydroperoxy epimer (II), yields 3-(2,2-dimethylpropylenedioxy)-6β - methyl - 5α,11β,20β-trihydroxy-16-pregnene (IV).

*Example 14*

In this example certain of the new compounds of this invention are prepared by a novel process therefor, which is illustratively represented by the following reaction sequence:

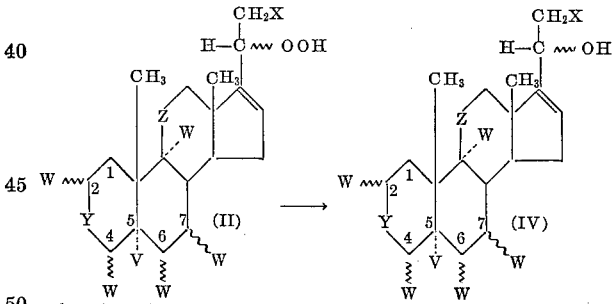

wherein 1(2), 4(5), 6(7), $\sim$, V, W, X, Y and Z have the same meanings as those given therefor following the flow-sheet in column 1.

Following the procedure of Example 13 but substituting for 20α-hydroperoxy-3-(2,2-dimethylpropylenedioxy)-6β-methyl-5α,11β-dihydroxy-16-pregnene (II) the following representative starting materials:

(1) 20α-hydroperoxy-11β,21-dihydroxy-4,16-pregnadien-3-one 21-acetate (II), (2) 20α-hydroperoxy-21-hydroxy-1,4,16-pregnatriene-3-11-dione (II), (3) 20α-hydroperoxy-11α,21-dihydroxy-4,6,16-pregnatrien-3-one (II), (4) 20α-hydroperoxy-3β,21-dihydroxy-16-pregnene (II), (5) 20α-hydroperoxy-3α,11β,21-trihydroxy-16-pregnene (II), (6) 20α-hydroperoxy-2α-fluoro-11β,21-dihydroxy-4,16-pregnadien-3-one (II), (7) 20α-hydroperoxy-2-methyl-11β,21-dihydroxy-1,4,16-pregnatrien-3-one (II), (8) 20α-hydroperoxy-4-fluoro-11β,21-dihydroxy-4,16-pregnadien-3-one (II), (9) 20α-hydroperoxy-4-methyl-11β,21-dihydroxy-1,4,16-pregnatrien-3-one (II),

(10) 20α-hydroperoxy-6α-fluoro-21-hydroxy-4,16-pregnadiene-3,11-dione (II),

(11) 20α-hydroperoxy-6α-methyl-11β,21-dihydroxy-1,4,16-pregnatrien-3-one 21-acetate (II)
(12) 20α-hydroperoxy-7α-chloro-11β,21-dihydroxy-4,16-pregnadien-3-one (II),
(13) 20α-hydroperoxy-7α-methyl-11β,21-dihydroxy-1,4,16-pregnatrien-3-one 21 acetate (II),
(14) 20α-hydroperoxy-9α-fluoro-11β,21-dihydroxy-1,4,16-pregnatrien-3-one (II),
(15) 20α-hydroperoxy-6α,9α-difluoro-11β,21-dihydroxy-4,16-pregnatrien-3-one (II),
(16) 20α-hydroperoxy-6α,9α-difluoro-11β,21-dihydroxy-2α,7-dimethyl-4,16-pregnatrien-3-one (II),
(17) 20α-hydroperoxy-3β,11β,21-trihydroxy-16-pregnene-3,21-diacetate (II),
(18) 20α-hydroperoxy-2α,9α-difluoro-11β,21-dihydroxy-6α-methyl-4,16-pregnadien-3-one (II),
(19) 20α-hydroperoxy-2,6α-difluoro-21-hydroxy-4,9α-dimethyl-1,4,16-pregnatrien-3-one (II),
(20) 20α-hydroperoxy-11β,21-dihydroxy-5,16-pregnadien-3-one 3-ethylene ketal (II),
(21) 20α-hydroperoxy-21-hydroxy-4,9(11),16-pregnatrien-3-one (II),
(22) 20α-hydroperoxy-6α,9α-dichloro-21-hydroxy-4,16-pregnadiene-3,11-dione 21-acetate (II),
(23) 20α-hydroperoxy-11β,21-dihydroxy-2,4,6α-trimethyl-1,4,16-pregnatrien-3-one (II),
(24) 20α-hydroperoxy-11β,21-dihydroxy-2α,4,6α-9α-tetrafluoro-4,16-pregnadien-3-one 21-acetate (II),
(25) 20α-hydroperoxy-11β,21-dihydroxy-2α,9α-difluoro-4,6α-dimethyl-4,16-pregnadien-3-one (II),
(26) 20α-hydroperoxy-11β-hydroxy-4,16-pregnadien-3-one (II),
(27) 20α-hydroperoxy-1,4,6,16-pregnatetraene-3,11-dione (II),
(28) 20α-hydroperoxy-11β-hydroxy-16-pregnen-3-one (II),
(29) 20α-hydroperoxy-2α-methyl-16-pregnen-3-one (II),
(30) 20α-hydroperoxy-3β-hydroxy-16-pregnene (II),
(31) 20α-hydroperoxy-2α-fluoro-11β-hydroxy-16-pregnen-3-one (II),
(32) 20α-hydroperoxy-4-fluoro-11β-hydroxy-4,16-pregnadien-3-one (II),
(33) 20α-hydroperoxy-4-methyl-1,4,16-pregnatriene-3-11-dione (II),
(34) 20α-hydroperoxy-6α-fluoro-11β-hydroxy-4,16-pregnadien-3-one (II)
(35) 20α-hydroperoxy-6α-methyl-11β-hydroxy-1,4,16-pregnatrien-3-one (II),
(36) 20α-hydroperoxy-7α-methyl-11β-hydroxy-4,16-pregnadien-3-one (II),
(37) 20α-hydroperoxy-7α-fluoro-11β-hydroxy-1,4,16-pregnatrien-3-one (II),
(38) 20α-hydroperoxy-11β-hydroxy-4,16-pregnadien-3-one (II),
(39) 20α-hydroperoxy-11β-hydroxy-9α-fluoro-1,4,16-pregnatrien-3-one (II),
(40) 20α-hydroperoxy-6α,9α-difluoro-4,16-pregnadiene-3,11-dione (II),
(41) 20α-hydroperoxy-6-chloro-9α-fluoro-11β-hydroxy-4,6,16-pregnatrien-3-one (II),
(42) 20α-hydroperoxy-9α-fluoro-6α-methyl-11β-hydroxy-1,4,16-pregnatrien-3-one (II),
(43) 20α-hydroperoxy-6α,9α-difluoro-2α,4α-dimethyl-11β-hydroxy-4,16-pregnadien-3-one (II),
(44) 20α-hydroperoxy-3α-hydroxy-16-pregnen-3-acetate (II),
(45) 20α-hydroperoxy-6α-fluoro-11β-hydroxy-9α-methyl-4,16-pregnadien-3-one (II),
(46) 20α-hydroperoxy-1,5,16-pregnatrien-3-one 3-ethylene ketal (II),
(47) 20α-hydroperoxy-6α-chloro-4,9(11),16-pregnatrien-3-one (II),
(48) 20α-hydroperoxy-2,4,6α-trimethyl-11β-hydroxy-1,4,16-pregnatrien-3-one (II),
(49) 20α-hydroperoxy-2α,4,9α-trifluoro-4,16-pregnadiene-3,11-dione (II) and
(50) 20α-hydroperoxy-2α,6α-difluoro-11β-hydroxy-9α-methyl-4,16-pregnadien-3-one (II), yields, respectively, (1) 11β,20α,21-trihydroxy-4,16-pregnadien-3-one 21-acetate (IV),
(2) 20α,21-dihydroxy-1,4,16-pregnatriene-3,11-dione (IV),
(3) 11α,20α,21-trihydroxy-4,6,16-pregnatrien-3-one (IV),
(4) 3β,20α,21-trihydroxy-16-pregnene (IV),
(5) 3α,11β,20α,21-tetrahydroxy-16-pregnene (IV),
(6) 2α-fluoro-11β,20α,21-trihydroxy-4,16-pregnadien-3-one (IV),
(7) 2-methyl-11β,20α,21-trihydroxy-1,4,16-pregnatrien-3-one (IV),
(8) 4-fluoro-11β,20α,21-trihydroxy-1,4,16-pregnatrien-3-one (IV),
(9) 4-methyl-11β,20α,21-trihydroxy-4,16-pregnadien-3-one (IV),
(10) 6α-fluoro-20α,21-dihydroxy-4,16-pregnadiene-3,11-dione (IV),
(11) 6α-methyl-11β,20α,21-trihydroxy-1,4,16-pregnatrien-3-one (IV),
(12) 7α-chloro-11β,20α,21-trihydroxy-4,16-pregnadien-3-one (IV),
(13) 7α-methyl-11β,20α,21-trihydroxy-1,4,16-pregnatrien-3-one (IV),
(14) 9α-fluoro-11β,20α,21-trihydroxy-1,4,16-pregnatrien-3-one (IV),
(15) 6α,9α-difluoro-11β,20α,21-trihydroxy-4,6,16-pregnatrien-3-one (IV),
(16) 6α,9α-difluoro-2α,7-dimethyl-11β,20α,21-trihydroxy-4,6,16-pregnatrien-3-one (IV),
(17) 3β,11β,20α,21-tetrahydroxy-16-pregnene-3,21-diacetate (IV),
(18) 2α,9α-difluoro-6α-methyl-11β,20α,21-trihydroxy-4,16-pregnadien-3-one (IV),
(19) 2,6α-difluoro-20α,21-dihydroxy-4,9α-dimethyl-1,4,16-pregnatrien-3-one (IV),
(20) 11β,20α,21-trihydroxy-5,16-pregnadien-3-one 3-ethylene ketal (IV),
(21) 20α,21-dihydroxy-4,9(11),16-pregnatrien-3-one (IV),
(22) 6α,9α-dichloro-20α,21-dihydroxy-4,16 - pregnadiene-3,11-dione 21-acetate (IV),
(23) 11β,20α,21-trihydroxy-2,4,6α-trimethyl-1,4,16-pregnatrien-3-one (IV),
(24) 11β,20α,21-trihydroxy-2α, 4,6α,9α-tetrafluoro-4,16-pregnadien-3-one 21-acetate (IV),
(25) 2α,9α-difluoro-4,6α-dimethyl-11β,20α,21-trihydroxy-4,16-pregnadien-3-one (IV),
(26) 11β,20α-dihydroxy-4,16-pregnadien-3-one (IV),
(27) 20α-hydroxy-1,4,6-16-pregnatetraene-3,11-dione (IV),
(28) 11β,20α-dihydroxy-16-pregnen-3-one (IV),
(29) 20α-hydroxy-2α-methyl-16-pregnen-3-one (IV),
(30) 3β,20α-dihydroxy-16-pregnene (IV),
(31) 11β,20α-dihydroxy-2α-fluoro-16-pregnen-3-one (IV),
(32) 11β,20α-dihydroxy-4-fluoro-4,16-pregnadien-3-one (IV),
(33) 20α-hydroxy-4-methyl-1,4,16-pregnatriene-3,11-dione (IV),
(34) 11β,20α-dihydroxy-6α-fluoro-4,16-pregnadien-3-one (IV),
(35) 11β,20α-dihydroxy-6α-methyl-1,4,16-pregnatrien-3-one (IV),
(36) 11β,20α-dihydroxy-7α-methyl-4,16-pregnadien-3-one (IV),
(37) 11β,20α-dihydroxy-7α-fluoro-1,4,16-pregnatrien-3-one (IV),

(38) 11β,20α-dihydroxy-4,16-pregnadien-3-one (IV),
(39) 11β,20α-dihydroxy-9α-fluoro-1,4,16-pregnatrien-3-one (IV),
(40) 6α,9α-difluoro-20α-hydroxy-4,16-pregnadiene-3,11-dione (IV),
(41) 6-chloro-11β,20α-dihydroxy-9α-fluoro-4,6,16-pregnatrien-3-one (IV),
(42) 11β,20α-dihydroxy-9α-fluoro-6α-methyl-1,4,16-pregnatrien-3-one (IV),
(43) 6α,9α-difluoro-11β,20α-dihydroxy-2α,4α-dimethyl-4,16-pregnadien-3-one (IV),
(44) 3α,20α-dihydroxy-16-pregnen 3-acetate (IV),
(45) 11β,20α-dihydroxy-6α-fluoro-9α-methyl-4,16-pregnadien-3-one (IV),
(46) 20α-hydroxy-1,5,16-pregnatrien-3-one 3-ethylene ketal (IV),
(47) 6α-chloro-20α-hydroxy-4,9(11),16-pregnatrien-3-one (IV),
(48) 11β,20α-dihydroxy-2,4,6α-trimethyl-1,4,16-pregnatrien-3-one (IV),
(49) 20α-hydroxy-2α,4,9α-trifluoro-4,16-pregnadiene-3,11-dione (IV) and
(50) 2α,6α-difluoro-11β,20α-dihydroxy-9α-methyl-4,16-pregnadien-3-one (IV).

The 20β-hydroxy compounds (IV) corresponding otherwise to the 20α-hydroxides (IV) produced in (1) to (50), above, are prepared in the manner disclosed in the last paragraph of Example 13.

*Example 15.*—(2 - 2 - dimethylpropylenedioxy) - 5β,11-dihydroxy-6 -methyl-16-pregnen-20-one (III)

A mixture of 200 mg. of 3-(2,2-dimethylpropylenedioxy)-6β-methyl-5α,11β,20α-trihydroxy-16-pregnene (IV) (prepared as in Example 13) and 2 g. of activated manganese dioxide [prepared in the manner disclosed in J. Chem. Soc. 1094 (1952)] in 25 ml. of ethyl acetate was shaken for a period of about 16 hours. The mixture was filtered, the solvent evaporated and the residue chromatographed on a column of 20 g. of Florisil. Elution with a mixture of 7.5% acetone in Skellysolve B gave 160 mg. of crystalline fractions, which were pooled and recrystallized from acetone-Skellysolve B to give 46 mg. of 3-(2,2-dimethylproplenedioxy) - 5α,11β-dihydroxy-6β - methyl-16-pregnen-20-one (III), melting at 213 to 214° C. and with absorption λ max. at 239 mμ ϵ = 9150. The infrared absorption spectrum of this compound was identical to that of the minor product (III) obtained directly from the irradiation reaction of Example 8.

*Anal.*—Calcd. for $C_{27}H_{42}O_5$: C, 72.61; H, 9.48. Found: C, 72.25; H, 9.83.

Following the procedure of Example 15 but substituting for 3 - (2,2-dimethylpropylenedioxy) - 6β - methyl-5α,11β,20α-trihydroxy-16-pregnene (IV) the corresponding 20β-hydroxy compound (IV), also yields 3-(2,2-dimethylpropylenedioxy)-5α,11β-dihydroxy - 6β - methyl-16-pregnen-20-one (III).

*Example 16*

In this example certain of the new compounds of this invention are prepared by a novel process therefor, which is illustratively represented by the following reaction sequence:

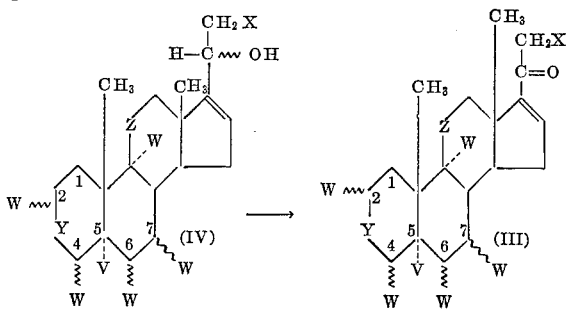

wherein 1(2), 4(5), 6(7), ⁓, V, W, X, Y and Z have the same meanings as those given therefor following the flow-sheet in column 1.

Following the procedure of Example 15 but substituting for 3 - (2,2 - dimethylpropylenedioxy - 6β - methyl-5α,11β,20α-trihydroxy-16-pregnene (IV) the following representative starting materials:

(1) 11β,20α,21-trihydroxy-1,4,16-pregnatrien-3-one 21-acetate (IV),
(2) 11α,20α,21-trihydroxy-4,6,16-pregnatrien-3-one (IV),
(3) 3α,11β,20α,21-tetrahydroxy-16-pregnene (IV),
(4) 2-fluoro-11β,20α,21-trihydroxy-1,4,16-pregnatrien-3-one (IV),
(5) 2α-methyl-11β,20α,21-trihydroxy-4,16-pregnatrien-3-one (IV),
(6) 4-fluoro - 11β,20α,21 - trihydroxy-4,16 - pregnadien-3-one (IV),
(7) 4-methyl-11β,20α,21-trihydroxy-1,4,16 - pregnatrien-3-one (IV),
(8) 20α,21-dihydroxy-6α - fluoro-1,4,16 - pregnatrien - 3-one (IV),
(9) 6α-methyl-11β,20α,21-trihydroxy - 4,16-pregnadien-3-one (IV),
(10) 9α,fluoro-11β,20α,21-trihydroxy - 4,16-pregnadien-3-one (IV),
(11) 11β,20α,21 - trihydroxy - 5,16 - pregnadien - 3 - one 3-ethylene ketal (IV),
(12) 6α,9α-difluoro-20α,21-dihydroxy -1,-4,16-pregnatriene-3,11-dione 21-acetate (IV),
(13) 2,9α-difluoro-4α,6α-dimethyl-11β,20α,21-trihydroxy-1,4,16-pregnatrien-3-one (IV),
(14) 11β,20α-dihydroxy-1,4,16-pregnatrien-3-one (IV),
(15) 20α-hydroxy-2α-methyl-16-pregnen-3-one (IV),
(16) 3β,20α-dihydroxy-16-pregnene (IV),
(17) 20α-hydroxy-4-methyl - 4,16 - pregnadiene-3,11-dione (IV),
(18) 11β,20α-dihydroxy-6α-fluoro - 1,4,16 - pregnatriene-3-one (IV),
(19) 11β,20α-dihydroxy-6α-methyl - 4,16 - pregnadien-3-one (IV),
(20) 11β,20α-dihydroxy-7α-fluoro - 4,16 - pregnadien-3-one (IV),
(21) 11β,20α-dihydroxy-7α-fluoro - 4,16 - pregnadien-one (IV),
(22) 6α,9α-difluoro-11β,20α - dihydroxy - 2,4 - dimethyl-1,4,16-pregnatriene-3-one (IV),
(23) 11β,20α-dihydroxy-1,5,16-pregnatrien - 3 - one 3-ethylene ketal (IV),
(24) 6α-chloro-20α-hydroxy-4,9(11),16 - pregnatrien-3-one (IV) and
(25) 11β,20α-dihydroxy-2α,4,6α - trimethyl - 4,16 - pregnadien-3-one (IV).

yields, respectively, (1) 11β,21-dihydroxy-1,4,16-pregnatriene - 3,20 - dione 21-acetate (III),
(2) 11α,21-dihydroxy-4,6,16-pregnatriene - 3,20 - dione (III),
(3) 3α,11β,21-trihydroxy-16-pregnene-20-one (III),
(4) 11β,21-dihydroxy - 2 - fluoro - 1,4,16 - pregnatriene-3,20-dione (III),
(5) 11β,21-dihydroxy-2α-methyl-4,16-pregnadiene - 3,20-dione (III),
(6) 11β,21-dihydroxy-4-fluoro-4,16 - pregnadiene - 3,20-dione (III),
(7) 11β,21-dihydroxy-4-methyl - 1,4,16 - pregnatriene-3,20-dione (III),
(8) 6α-fluoro-21-hydroxy-1,4,6-pregnatriene - 3,20 - dione (III),
(9) 11β,21-dihydroxy-6α-methyl-4,16-pregnadien - 3,20-dione (III),
(10) 11β,21-dihydroxy-9α-fluoro-4,16-pregnadiene - 3,20-dione (III),

(11) 11β,21-dihydroxy-5,16-pregnadiene - 3,20 - dione 3-ethylene ketal (III),
(12) 6α,9α-difluoro-21-hydroxy - 1,4,16 - pregnatriene-3,11,20-trione 21-acetate (III),
(13) 2,9α-difluoro-11β,21-dihydroxy - 4α,6α - dimethyl-1,4,16-pregnatriene-3,20-dione (III),
(14) 11β-hydroxy-1,4,16-pregnatriene-3,20-dione (III).
(15) 2α-methyl-16-pregnene-3,20-dione (III),
(16) 3β-hydroxy-16-pregnen-20-one (III),
(17) 4-methyl-4,16-pregnadiene-3,11,20-trione (III),
(18) 6α-fluoro-11β-hydroxy-1,4,16 - pregnatriene - 3,20-dione (III),
(19) 11β-hydroxy-6α-methyl-4,16 - pregnadiene - 3,20-dione (III),
(20) 7α-fluoro-11β-hydroxy - 4,16 - pregnadiene - 3,20-dione (III),
(21) 9α-fluoro-11β-hydroxy - 4,16 - pregnadiene - 3,20-dione (III),
(22) 6α,9α-difluoro-2,4-dimethyl - 11β - hydroxy-1,4,16-pregnatriene-3,20-dione (III),
(23) 11β-hydroxy-1,5,16-pregnatriene-3,20-dione 3-ethylene ketal (III),
(24) 6α-chloro-4,9(11),16 - pregnatriene - 3,20 - dione (III) and
(25) 11β - hydroxy-2α,4,6α-trimethyl-4,16-pregnadiene-3,20-dione (III).

We claim:
1. Compounds of the formula

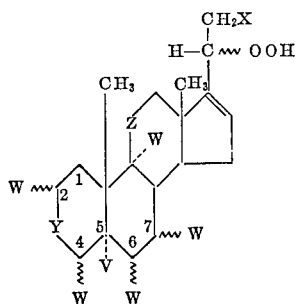

wherein the 1(2), 4(5) and 6(7)-carbon atom linkages are selected from the group consisting of single bonds and double bonds; ⁓ is a generic expression denoting α- and β-bonds and mixtures thereof; V is selected from the group consisting of hydrogen and hydroxy, with the proviso that V is not present when the 4(5)-carbon atom linkage is a double bond; W is selected from the group consisting of hydrogen, methyl, chlorine and fluorine; X is selected from the group consisting of hydrogen, hydroxy and the acyloxy radical of a hydrocarbon carboxylic acid containing from one to twelve carbon atoms, inclusive; Y is selected from the group consisting of the α-hydroxymethylene radical

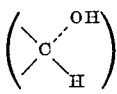

the β-hydroxymethylene radical

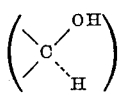

the α-acyloxymethylene radical

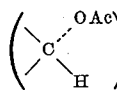

wherein Ac is the acyl radical of a hydrocarbon carboxylic acid containing from one to twleve carbon atoms, inclusive, the β-acyloxymethylene radical

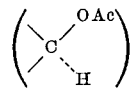

wherein Ac has the same meaning as above, the carbonyl radical (>C=O) and an alkylene ketal radical of the formula

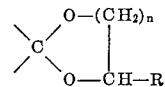

wherein $n$ is selected from the group consisting of the integers one and two and R is selected from the group consisting of hydrogen and a lower-alkyl radical containing from one to six carbon atoms, inclusive; when Y is a carbonyl radical the 1(2), 4(5), 6(7) and 9(11)-carbon atom linkages are selected from the group consisting of single and double bonds; when Y is other than a carbonyl radical the 1(2), 4(5), 6(7) and 9(11)-carbon atom linkages are single bonds; Z is selected from the group consisting of the methylene radical (>CH₂), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond.

2. 20α-hydroperoxy - 11β,21 - dihydroxy - 4,16 - pregnadien-3-one of the formula

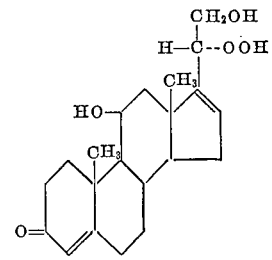

3. 20α-hydroperoxy - 11β,21 - dihydroxy - 1,4,16-pregnatrien-3-one of the formula

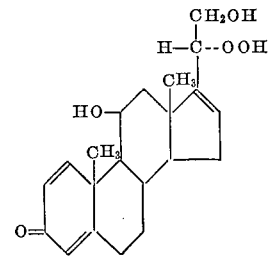

4. 3-(2,2-dimethylpropylenedioxy) - 20α-hydroperoxy-6β-methyl - 5α,11β,21-trihydroxy - 16-pregnene of the formula

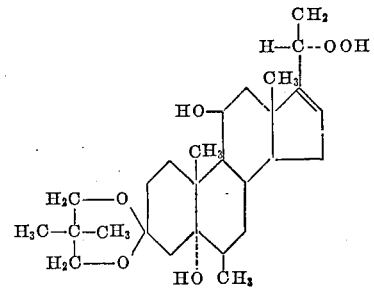

5. 3-(2,2-dimethylpropylenedioxy) - 20α-hydroperoxy-5α,11β-dihydroxy-6β-methyl-16-pregnene of the formula

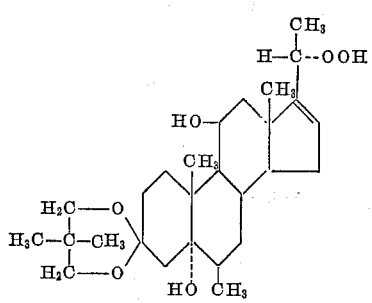

6. 20α-hydroperoxy-6β-fluoro - 5α,11β,21-trihydroxy-16-pregnen-3-one 3-ethylene ketal of the formula

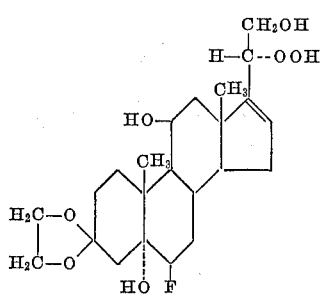

7. Compounds of the formula

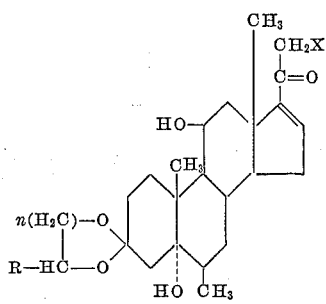

wherein n is selected from the group consisting of the integers one and two, R is selected from the group consisting of hydrogen and a lower-alkyl radical containing from one to six carbon atoms, inclusive; X is selected from the group consisting of hydrogen, hydroxy and the acyloxy radical of a hydrocarbon carboxylic acid containing from one to twelve carbon atoms, inclusive.

8. 3-(2,2-dimethylpropylenedioxy) - 6β-methyl-5α,11β,21-trihydroxy - 16-pregnen - 20-one 21-acylate of the formula

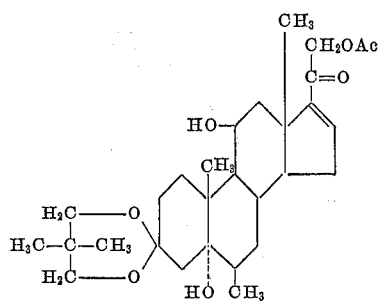

wherein Ac is the acyl radical of a hydrocarbon carboxylic acid containing from one to twelve carbon atoms, inclusive.

9. Compounds of the formula

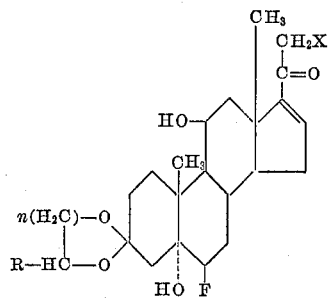

wherein n is selected from the group consisting of the integers one and two, R is selected from the group consisting of hydrogen and a lower-alkyl radical containing from one to six carbon atoms, inclusive; X is selected from the group consisting of hydrogen, hydroxy and the acyloxy radical of a hydrocarbon carboxylic acid containing from one to twelve carbon atoms, inclusive.

10. A process for the production of a compound of the Formula II

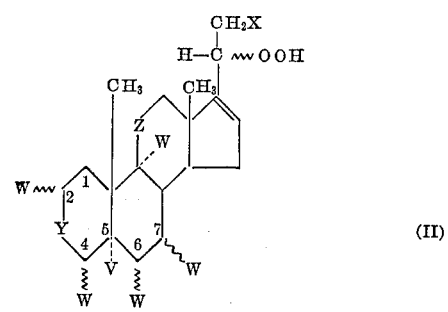

(II)

wherein the 1(2), 4(5) and 6(7)-carbon atom linkages are selected from the group consisting of single bonds and double bonds; ∿ is a generic expression denoting α- and β-bonds and mixtures thereof with the proviso that V is not present when the 4(5)-carbon atom linkage is a double bond; V is selected from the group consisting of hydrogen and hydroxy; W is selected from the group consisting of hydrogen, methyl, chlorine and fluorine, X is selected from the group consisting of hydrogen, hydroxy and the acyloxy radical of an organic carboxylic acid containing from one to twelve carbon atoms, inclusive; Y is selected from the group consisting of the α-hydroxymethylene radical

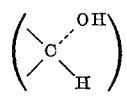

the β-hydroxymethylene radical

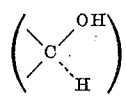

the α-acyloxymethylene radical

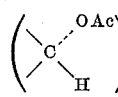

wherein Ac is the acyl radical of an organic carboxylic acid containing from one to twelve carbon atoms, inclusive, the β-acyloxymethylene radical

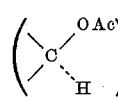

wherein Ac has the same meaning as above, the carbonyl radical (>C=O) and an alkylene ketal radical of the formula

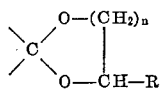

wherein $n$ is selected from the group consisting of the integers one and two and R is selected from the group consisting of hydrogen and a lower-alkyl radical containing from one to six carbon atoms, inclusive; when Y is a carbonyl radical the 1(2), 4(5), 6(7) and 9(11)-carbon atom linkages are selected from the group consisting of single and double bonds; when Y is other than a carbonyl radical the 1(2), 4(5), 6(7) and 9(11)-carbon atom linkages are single bonds; Z is selected from the group consisting of the methylene radical (>CH$_2$), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond, which comprises subjecting to photosensitized oxygenation a corresponding compound of the Formula I

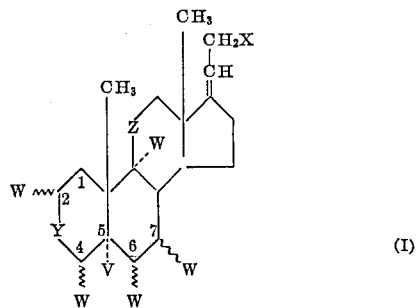

wherein 1(2), 4(5), 6(7), ∼, V, W, X, Y and Z have the same meanings as above.

11. A process for the production of 20α-hydroperoxy-11β,21-dihydroxy-4,16-pregnadien-3-one (II) which comprises subjecting 11β,21-dihydroxy-4,17(20)-cis-pregnadien-3-one (I) to photosensitized oxygenation.

12. A process for the production of 20α-hydroperoxy-11β,21-dihydroxy-1,4,16-pregnatrien-3-one (II) which comprises subjecting 11β,21-dihydroxy-1,4,17(20)-cis-pregnatrien-3-one (I) to photosensitized oxygenation.

13. A process for the production of a compound of the Formula III

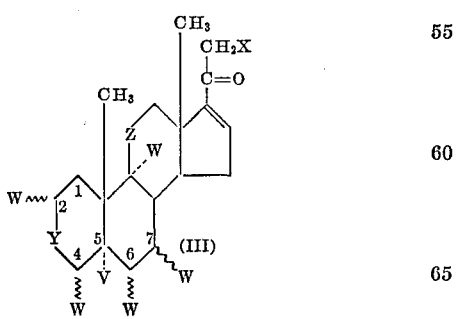

wherein the 1(2), 4(5) and 6(7)-carbon atom linkages are selected from the group consisting of single bonds and double bonds; ∼ is a generic expression denoting α- and β- bonds and mixtures thereof; V is selected from the group consisting of hydrogen and hydroxy with the proviso that V is not present when the 4(5)-carbon atom linkage is a double bond; W is selected from the group consisting of hydrogen, methyl, chlorine and fluorine; X is selected from the group consisting of hydrogen, hydroxy and the acyloxy radical of an organic carboxylic acid containing from one to twelve carbon atoms, inclusive; Y is selected from the group consisting of the α-hydroxymethylene radical

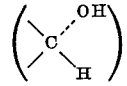

the β-hydroxymethylene radical

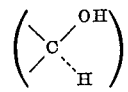

the α-acyloxymethylene radical

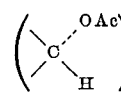

wherein Ac is the acyl radical of an organic carboxylic acid containing from one to twelve carbon atoms, inclusive, the β-acyloxymethylene radical

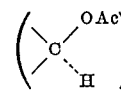

wherein Ac has the same meaning as above, the carbonyl radical (>C=O) and an alkylene ketal radical of the formula

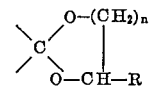

wherein $n$ is selected from the group consisting of the integers one and two and R is selected from the group consisting of hydrogen and a lower-alkyl radical containing from one to six carbon atoms, inclusive; when Y is a carbonyl radical the 1(2), 4(5), 6(7) and 9(11)-carbon atom linkages are selected from the group consisting of single and double bonds; when Y is other than a carbonyl radical the 1(2), 4(5), 6(7) and 9(11)-carbon atom linkages are single bonds; Z is selected from the group consisting of the methylene radical (>CH$_2$), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond, which comprises subjecting to dehydration at the 20-position a corresponding compound of the Formula II

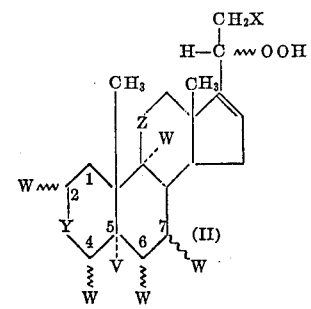

wherein 1(2), 4(5), 6(7), ∼, V, W, X, Y and Z have the same meanings as above.

14. A process for the production of a compound of the Formula III (III)

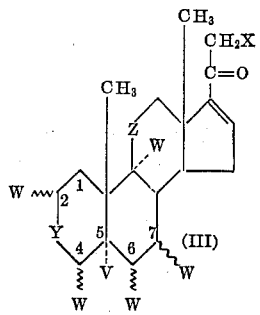

wherein the 1(2), 4(5) and 6(7)-carbon atom linkages are selected from the group consisting of single bonds and double bonds; ⌇ is a generic expression denoting α- and β-bonds and mixtures thereof; V is selected from the group consisting of hydrogen and hydroxy with the proviso that V is not present when the 4(5)-carbon atom linkage is a double bond; W is selected from the group consisting of hydrogen, methyl, chlorine and fluorine; X is selected from the group consisting of hydrogen, hydroxy and the acyloxy radical of an organic carboxylic acid containing from one to twelve carbon atoms, inclusive; Y is selected from the group consisting of the α-hydroxymethylene radical

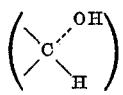

the β-hydroxymethylene radical

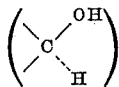

the α-acyloxymethylene radical

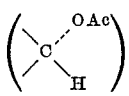

wherein Ac is the acyl radical of an organic carboxylic acid containing from one to twelve carbon atoms, inclusive, the β-acyloxymethylene radical

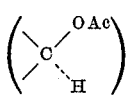

wherein Ac has the same meaning as above, the carbonyl radical (>C=O) and an alkylene ketal radical of the formula

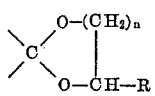

wherein $n$ is selected from the group consisting of the integers one and two and R is selected from the group consisting of hydrogen and a lower-alkyl radical containing from one to six carbon atoms, inclusive; when Y is a carbonyl radical the 1(2), 4(5), 6(7) and 9(11)-carbon atom linkages are selected from the group consisting of single and double bonds; when Y is other than a carbonyl radical the 1(2), 4(5), 6(7) and 9(11)-carbon atom linkages are single bonds; Z is selected from the group consisting of the methylene radical (>CH₂), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond, which comprises (1) subjecting to photosensitized oxygenation a corresponding compound of the Formula I

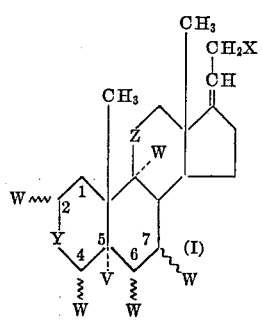

wherein 1(2), 4(5), 6(7), ⌇, V, W, X, Y and Z have the same meanings as above, to produce a corresponding compound of the Formula II

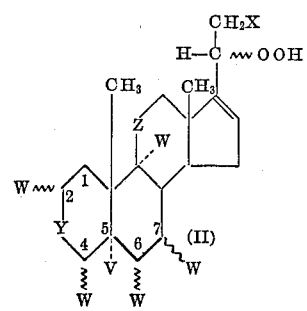

wherein 1(2), 4(5), 6(7), ⌇, V, W, X, Y and Z have the same meanings as above, and (2) subjecting a thus produced corresponding compound of Formula II to dehydration at the 20-position to yield a corresponding compound of Formula III, above.

15. A process for the production of 11β,21-dihydroxy-4,16-pregnadiene-3,20-dione (III) which comprises (1) subjecting 11β,21 - dihydroxy-4,17(20)-cis-pregnadien-3-one (I) to photosensitized oxygenation to yield 11β,21-dihydroxy-4,16-pregnadien-3-one (II) and (2) subjecting the thus produced compound (II) to dehydration at the 20-position to yield 11β,21-dihydroxy-4,16-pregnadiene-3,20-dione (III).

16. A process for the production of 11β,21-dihydroxy-1,4,16-pregnatriene-3,20-dione (III) which comprises (1) subjecting 11β,21 - dihydroxy-1,4,17(20)-cis-pregnatrien-3-one (I) to photosensitized oxygenation to yield 11β,21-dihydroxy-1,4,16-pregnatrien-3-one (II) and (2) subjecting the thus produced compound (II) to dehydration at the 20-position to yield 11β,21-dihydroxy-1,4,16-pregnatriene-3,20-dione (III).

17. A process for the production of 3-(2,2-dimethylpropylenedioxy)-6β-methyl-5α,11β,21-trihydroxy-16-pregnen-20-one (III) which comprises (1) subjecting 3-(2,2-dimethylpropylenedioxy)- 6β - methyl - 5α - 11β,21 - trihydroxy-17(20)-pregnene (I) to photosensitized oxygenation to yield 3-(2,2-dimethylpropylenedioxy)-20α-hydroperoxy-6β-methyl - 5α,11β,21 - trihydroxy - 16 - pregnen (II) and (2) subjecting the thus produced compound (II) to dehydration at the 20-position to yield 3-(2,2-dimethylpropylenedioxy)-6β-methyl-5α,11β,21-trihydroxy-16-pregnen-20-one (III).

18. A process for the production of 6β-fluoro-5α,11β,21-trihydroxy-16-pregnene-3,20-dione 3-ethylene ketal (III) which comprises (1) subjecting 6β-fluoro-5α,11β,21-trihydroxy-17(20)-pregnen-3-one 3-ethylene ketal (I) to photosensitized oxygenation to yield 20α-hydroperoxy-6β-fluoro-5α,11β,21-trihydroxy-16-pregnen-3-one 3-ethylene ketal (II) and (2) subjecting the thus produced compound (II) to dehydration at the 20-position to yield 6β-fluoro-5α-11β,21-trihydroxy-16-pregnene-3,20-dione 3-ethylene ketal (III).

19. A process for the production of 6β-fluoro-5α,11β-dihydroxy-16-pregnene-3,20-dione 3-ethylene ketal (III) which comprises (1) subjecting 6β-fluoro-5α,11β-dihydroxy-17(20)-pregnen-3-one 3-ethylene ketal (I) to photosensitized oxygenation to yield 20α-hydroperoxy-6β-fluoro-5α,11β-dihydroxy-16-pregnen-3-one 3-ethylene ketal (II) and (2) subjecting the thus produced compound (II) to dehydration at the 20-position to yield 6β-fluoro-5α, 11β-dihydroxy-16-pregnene-3,20-dione 3-ethylene ketal (II).

20. A process for the production of a compound of the Formula IV

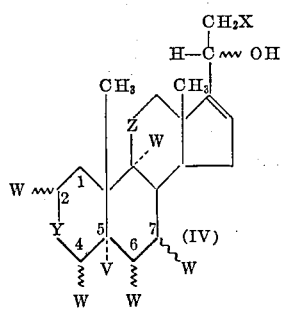

wherein the 1(2), 4(5) and 6(7)-carbon atom linkages are selected from the group consisting of single bonds and double bonds; ⟿ is a generic expression denoting α- and β-bonds and mixtures thereof; V is selected from the group consisting of hydrogen and hydroxy with the proviso that V is not present when the 4(5)-carbon atom linkage is a double bond; W is selected from the group consisting of hydrogen, methyl, chlorine and fluorine; X is selected from the group consisting of hydrogen, hydroxy and the acyloxy radical of an organic carboxylic acid containing from one to twelve carbon atoms, inclusive; Y is selected from the group consisting of the α-hydroxymethylene radical

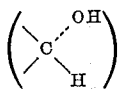

the β-hydroxymethylene radical

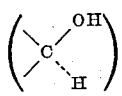

the α-acyloxymethylene radical

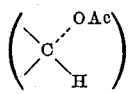

where Ac is the acyl radical of an organic carboxylic acid containing from one to twelve carbon atoms, inclusive, the β-acyloxymethylene radical

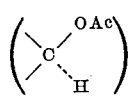

wherein Ac has the same meaning as above, the carbonyl radical (>C=O) and an alkylene ketal radical of the formula

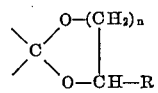

wherein $n$ is selected from the group consisting of the integers one and two and R is selected from the group consisting of hydrogen and a lower-alkyl radical containing from one to six carbon atoms, inclusive; when Y is a carbonyl radical the 1(2), 4(5), 6(7) and 9(11)-carbon atom linkages are selected from the group consisting of single and double bonds; when Y is other than a carbonyl radical the 1(2), 4(5), 6(7), and 9(11)-carbon atom linkages are single bonds; Z is selected from the group consisting of the methylene radical (>CH$_2$), the α-hydroxymethylene radical, the β-hydroxymethylene radical, the carbonyl radical and when W is selected from the group consisting of chlorine and fluorine, Z is additionally selected from the group consisting of chloromethylene and fluoromethylene; Z and W at the 9-position together constitute a 9(11)-double bond, which comprises (1) subjecting to photosensitized oxygenation a corresponding compound of the Formula I

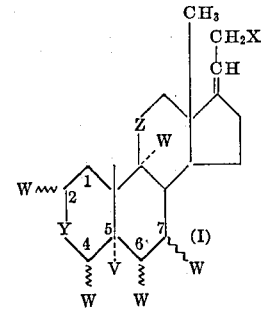

where in 1(2), 4(5), 6(7), ⟿, V, W, X, Y and Z have the same meanings as above, to produce a corresponding compound of the Formula II

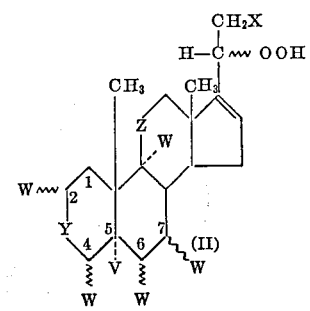

wherein 1(2), 4(5), 6(7), ⟿, V, W, X, Y and Z have the same meanings as above, and (2) subjecting a thus produced corresponding compound of Formula II to reduction at the 20-position to yield a corresponding compound of Formula IV, above.

No references cited.

LEWIS GOTTS, *Primary Examiner.*

ELBERT L. ROBERTS, *Assistant Examiner.*